(12) United States Patent
Yang et al.

(10) Patent No.: US 12,317,252 B2
(45) Date of Patent: May 27, 2025

(54) UCI MULTIPLEXING ENHANCEMENTS

(71) Applicant: Apple Inc., Cupertino, CA (US)

(72) Inventors: Weidong Yang, San Diego, CA (US);
Amir Farajidana, Sunnyvale, CA (US);
Chunhai Yao, Beijing (CN); Chunxuan Ye, San Diego, CA (US); Dawei Zhang, Saratoga, CA (US); Haitong Sun, Cupertino, CA (US); Hong He, San Jose, CA (US); Jie Cui, San Jose, CA (US); Oghenekome Oteri, San Diego, CA (US); Ruoheng Liu, San Diego, CA (US); Wei Zeng, Saratoga, CA (US); Yang Tang, San Jose, CA (US); Yuchul Kim, San Jose, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 266 days.

(21) Appl. No.: 17/779,408

(22) PCT Filed: Nov. 28, 2019

(86) PCT No.: PCT/CN2019/121562
§ 371 (c)(1),
(2) Date: May 24, 2022

(87) PCT Pub. No.: WO2021/102787
PCT Pub. Date: Jun. 3, 2021

(65) Prior Publication Data
US 2022/0417960 A1  Dec. 29, 2022

(51) Int. Cl.
*H04W 72/12* (2023.01)
*H04L 1/08* (2006.01)
(Continued)

(52) U.S. Cl.
CPC ........... *H04W 72/1263* (2013.01); *H04L 1/08* (2013.01); *H04W 24/08* (2013.01); *H04W 72/54* (2023.01)

(58) Field of Classification Search
CPC . H04W 72/1263; H04W 24/08; H04W 72/54; H04W 52/0216; H04W 72/1268;
(Continued)

(56) References Cited

U.S. PATENT DOCUMENTS

2019/0053218 A1   2/2019  Kim et al.
2021/0006315 A1*  1/2021  Wu ........................ H04W 24/10
(Continued)

FOREIGN PATENT DOCUMENTS

CN    104935368    9/2015
CN    107836092    3/2018
(Continued)

OTHER PUBLICATIONS

International Search Report and Written Opinion for PCT/CN2019/121562; 8 pages; Nov. 28, 2019.
(Continued)

*Primary Examiner* — Luat Phung
(74) *Attorney, Agent, or Firm* — Kowert, Hood, Munyon, Rankin & Goetzel, P.C.

(57) ABSTRACT

Apparatuses, systems, and methods to enhance system performance (e.g., UL throughput) without impinging on (e.g., tightening) processing timeline for UL-SCH data and/or CSI reporting. A base station may request for a UE to send a CSI report(s) during PDCCH monitoring. The base station may also request the UE to send UL-SCH data. At a first transmit opportunity, the UE may transmit first PUSCH (including UL-SCH data that may be multiplexed onto the first PUSCH). Additionally, at a second (later) transmit opportunity, the UE may transmit second PUSCH (including the
(Continued)

CSI report(s) that may be multiplexed onto the second PUSCH). The second transmit opportunity may be identified as a transmit opportunity starting at least a specified number of symbols after a first symbol of the first repetition. The specified number of symbols may be dependent upon at least one of UE uplink processing time capabilities or SCS.

20 Claims, 23 Drawing Sheets

(51) Int. Cl.
 *H04W 24/08* (2009.01)
 *H04W 72/1263* (2023.01)
 *H04W 72/54* (2023.01)
(58) Field of Classification Search
 CPC ........ H04W 72/21; H04W 72/23; H04L 1/08;
  H04L 1/1664; H04L 5/0057; H04L
  5/0053; H04L 1/0027; H04L 1/0072;
  H04L 1/0041; H04L 1/0026; H04L
  5/0044; H04L 5/0051; Y02D 30/70
 See application file for complete search history.

(56) References Cited

U.S. PATENT DOCUMENTS

| | | | |
|---|---|---|---|
| 2021/0013941 A1* | 1/2021 | Sun | H04L 5/0051 |
| 2021/0337415 A1* | 10/2021 | Chen | H04L 5/005 |
| 2021/0337552 A1* | 10/2021 | Taherzadeh Boroujeni | H04B 7/0626 |
| 2021/0359743 A1* | 11/2021 | Taherzadeh Boroujeni | H04B 7/0645 |

FOREIGN PATENT DOCUMENTS

| | | |
|---|---|---|
| CN | 108352885 | 7/2018 |
| CN | 110061805 A | 7/2019 |
| WO | 2015030523 | 3/2015 |
| WO | 2019183827 | 10/2019 |
| WO | 2019217543 A2 | 11/2019 |

OTHER PUBLICATIONS

Qualcomm Inc. "Summary of remaining issues for UCI multiplexing on PUSCH"; 3GPP TSG RAN WG1 Meeting #92bis R1-1805666; Sanya, China; 10 pages; Apr. 16-20, 2018.
Extended European Search Report for EP Patent Application No. 19953871.1; 9 pages; Oct. 5, 2022.
ETRI "UCI enhancements" 3GPP TSG RAN WG1 #99 R1-1912642; Reno, USA; 4 pages; Nov. 18, 2019.
Office Action for CN Patent Application No. 201980102599.0; Nov. 25, 2024.
Office Action for KR 10-2022-7017623; Feb. 14, 2025.
ZTE "Draft CR on UCI multiplexing in PUSCH" 3GPP TSG RAN WG1 Meeting #98 R1-1908327; Aug. 2019.

* cited by examiner

UCI MULTIPLEXING ENHANCEMENTS

FIELD

The present application relates to wireless devices, and more particularly to apparatuses, systems, and methods for a wireless device to enhance UIC multiplexing for URLLC.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) has become the technology of choice for the majority of wireless network operators worldwide, providing mobile broadband data and high-speed Internet access to their subscriber base. LTE defines a number of downlink (DL) physical channels, categorized as transport or control channels, to carry information blocks received from medium access control (MAC) and higher layers. LTE also defines a number of physical layer channels for the uplink (UL).

For example, LTE defines a Physical Downlink Shared Channel (PDSCH) as a DL transport channel. The PDSCH is the main data-bearing channel allocated to users on a dynamic and opportunistic basis. The PDSCH carries data in Transport Blocks (TB) corresponding to a MAC protocol data unit (PDU), passed from the MAC layer to the physical (PHY) layer once per Transmission Time Interval (TTI). The PDSCH is also used to transmit broadcast information such as System Information Blocks (SIB) and paging messages.

As another example, LTE defines a Physical Downlink Control Channel (PDCCH) as a DL control channel that carries the resource assignment for UEs that are contained in a Downlink Control Information (DCI) message. Multiple PDCCHs can be transmitted in the same subframe using Control Channel Elements (CCE), each of which is a nine set of four resource elements known as Resource Element Groups (REG). The PDCCH employs quadrature phase-shift keying (QPSK) modulation, with four QPSK symbols mapped to each REG. Furthermore, 1, 2, 4, or 8 CCEs can be used for a UE, depending on channel conditions, to ensure sufficient robustness.

Additionally, LTE defines a Physical Uplink Shared Channel (PUSCH) as a UL channel shared by all devices (user equipment, UE) in a radio cell to transmit user data to the network. The scheduling for all UEs is under control of the LTE base station (enhanced Node B, or eNB). The eNB uses the uplink scheduling grant (DCI format 0) to inform the UE about resource block (RB) assignment, and the modulation and coding scheme to be used. PUSCH typically supports QPSK and quadrature amplitude modulation (QAM). In addition to user data, the PUSCH also carries any control information necessary to decode the information, such as transport format indicators and multiple-in multiple-out (MIMO) parameters. Control data is multiplexed with information data prior to digital Fourier transform (DFT) spreading.

A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR proposes a higher capacity for a higher density of mobile broadband users, also supporting device-to-device, ultra-reliable, and massive machine communications, as well as lower latency and lower battery consumption, than current LTE standards. Further, the 5G-NR standard may allow for less restrictive UE scheduling as compared to current LTE standards. Consequently, efforts are being made in ongoing developments of 5G-NR to take advantage of higher throughputs possible at higher frequencies.

SUMMARY

Embodiments relate to apparatuses, systems, and methods for enhancement of UIC multiplexing, such as to enhance system performance (e.g., UL throughput) without impinging on and/or impacting (e.g., tightening) processing timeline for UL-SCH data and/or CSI reporting.

In some embodiments, a wireless device, e.g., such as a user equipment device (UE), may be configured to receive, from a base station, a request to send a refreshed (and/or updated and/or new) channel state information (CSI) report, e.g., during PDCCH monitoring. The base station may also request the UE to send (transmit) uplink shared channel (UL-SCH) data. At a first transmit opportunity, the UE may transmit first PUSCH. In some embodiments, UL-SCH data may be multiplexed onto the first PUSCH. Additionally, at a second (or later) transmit opportunity, the UE may transmit second (or later/additional) PUSCH along with the CSI report(s), e.g., the CSI report(s) may be multiplexed onto the second PUSCH. In some embodiments, the second transmit opportunity may be identified as a transmit opportunity (or repetition) that starts at least a specified number of symbols after a first symbol of the first repetition. In some embodiments, the specified number of symbols may be dependent upon at least one of UE uplink processing time capabilities or subcarrier spacing (SCS).

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1A:
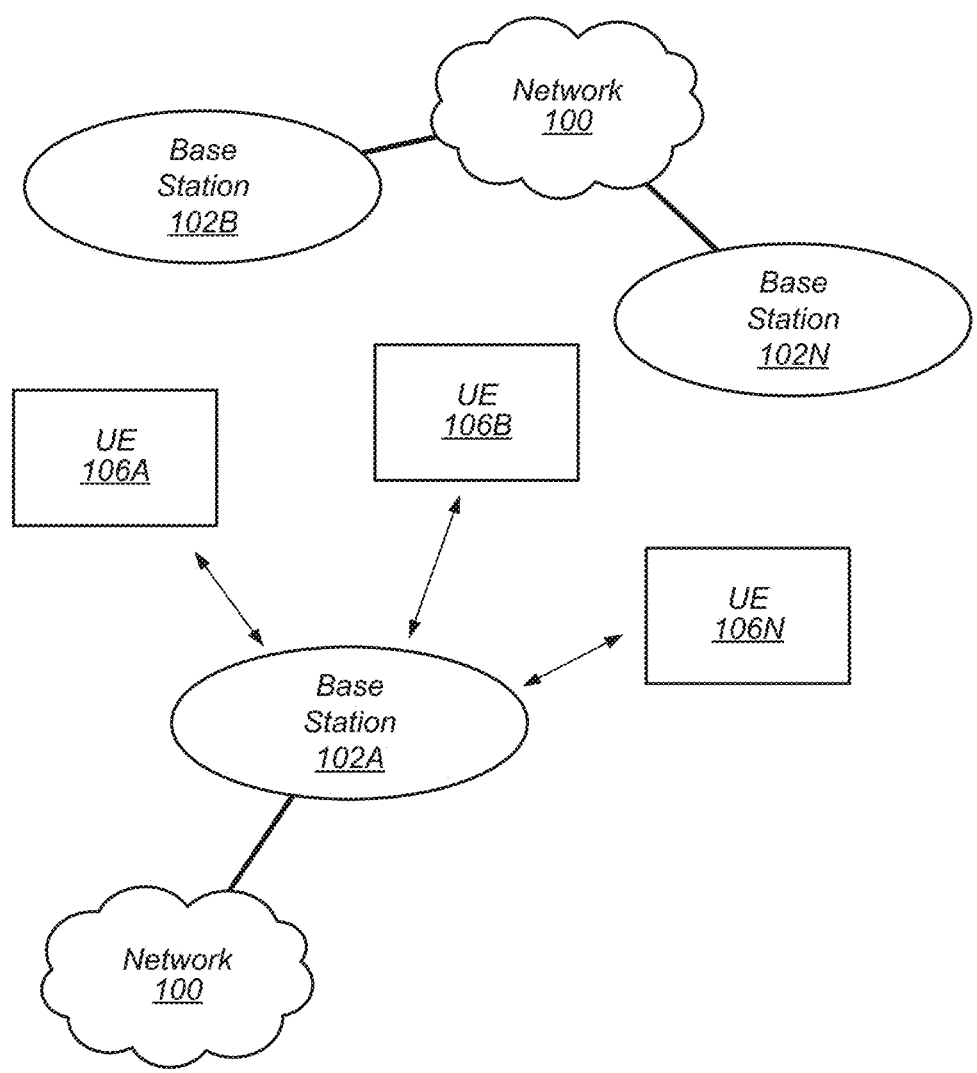
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
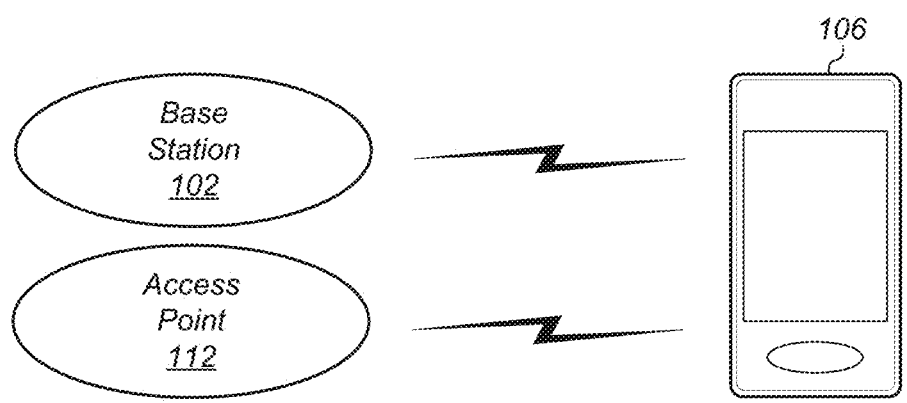
FIG. 1B illustrates an example of a base station (BS) and an access point in communication with a user equipment (UE) device according to some embodiments.

FIGS. 1A and 1B—Communication Systems

FIG. 1A illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
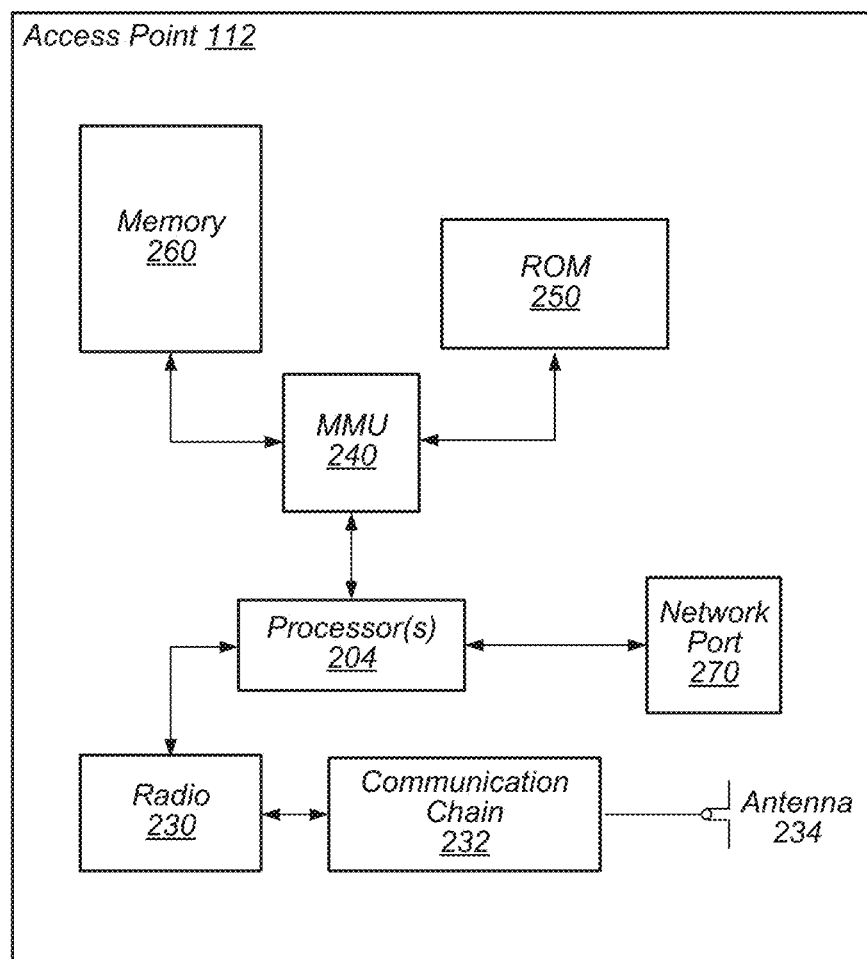
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as UEs 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with UE 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, 5G NR, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, an AP 112 may be configured to perform methods to enhance system performance (e.g., UL throughput) without impinging on (e.g., tightening) processing timeline for UL-SCH data and/or CSI reporting as further described herein.

Figure 3:
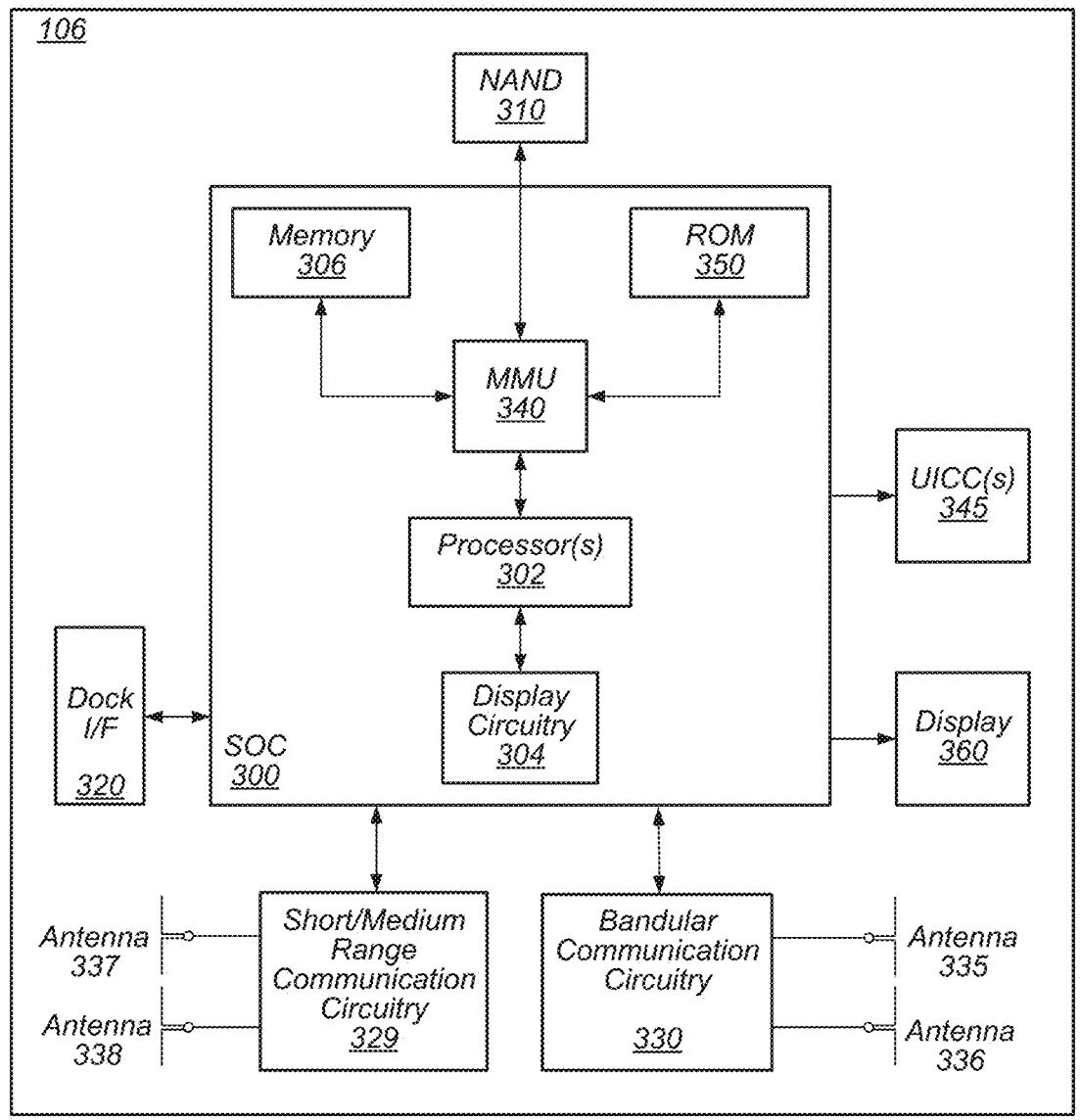
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short to medium range wireless communication circuitry 329, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform methods to enhance system performance (e.g., UL throughput) without impinging on (e.g., tightening) processing timeline for UL-SCH data and/or CSI reporting as further described herein.

As described herein, the communication device 106 may include hardware and software components for implementing the above features for a communication device 106 to communicate a scheduling profile for power savings to a network. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short to medium range wireless communication circuitry 329 may each include one or more processing elements. In other words, one or more processing elements may be included in cellular communication circuitry 330 and, similarly, one or more processing elements may be included in short to medium range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short to medium range wireless communication circuitry 329 may include one or more ICs that are configured to perform the functions of short to medium range wireless communication circuitry 329. In addition, each integrated circuit may include circuitry (e.g., first circuitry, second circuitry, etc.) configured to perform the functions of short to medium range wireless communication circuitry 329.

Figure 4:
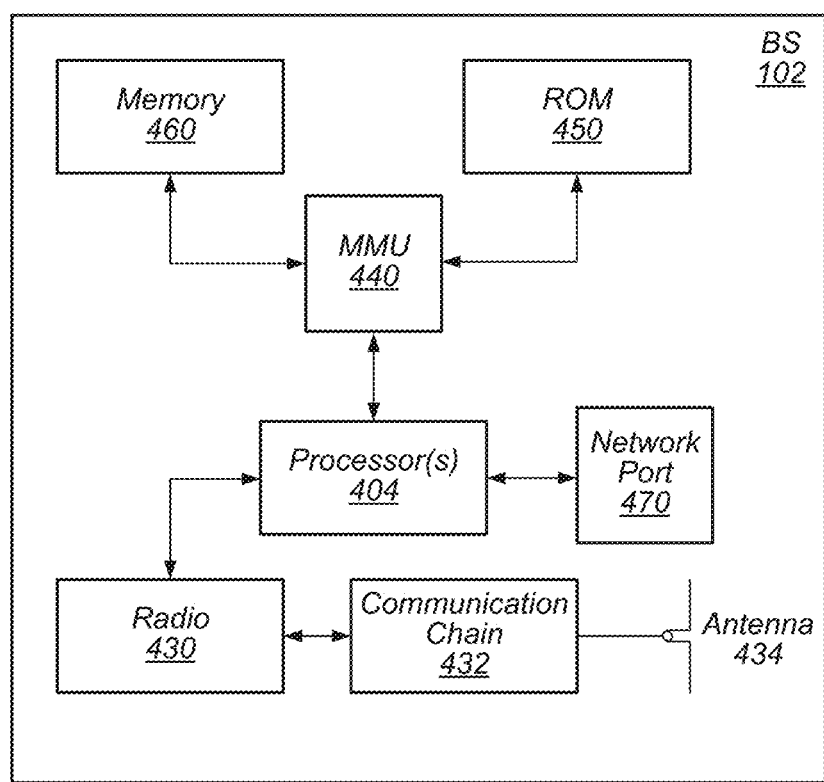
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
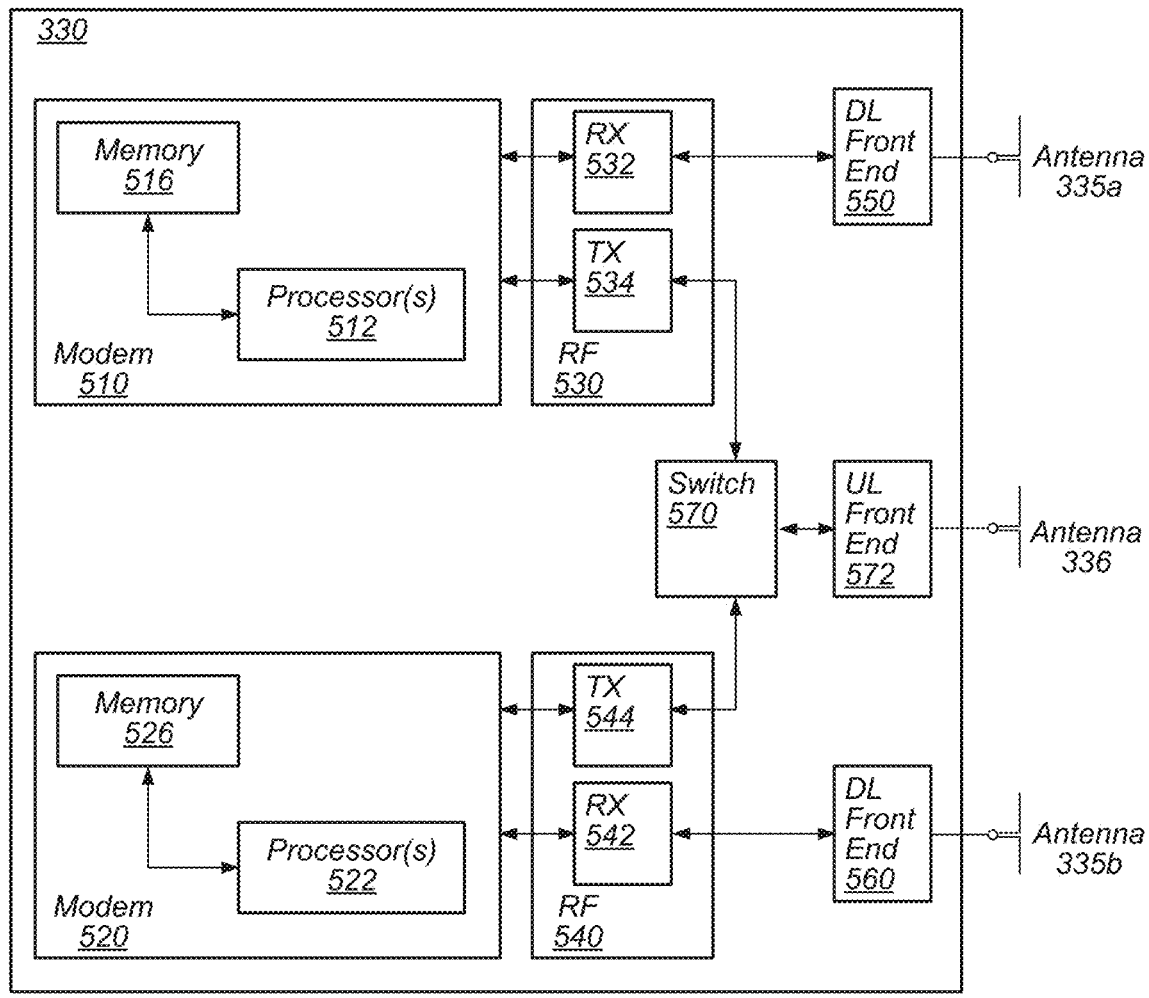
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to perform methods to enhance system performance (e.g., UL throughput) without impinging on (e.g., tightening) processing timeline for UL-SCH data and/or CSI reporting as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

5G NR Architecture with LTE

Figure 6A:
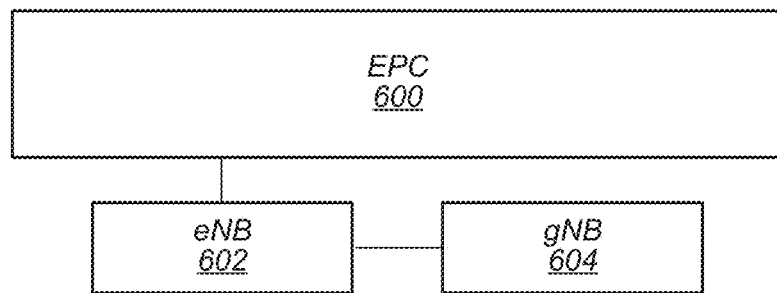
FIG. 6A illustrates an example of connections between an EPC network, an LTE base station (eNB), and a 5G NR base station (gNB).
Figure 6B:
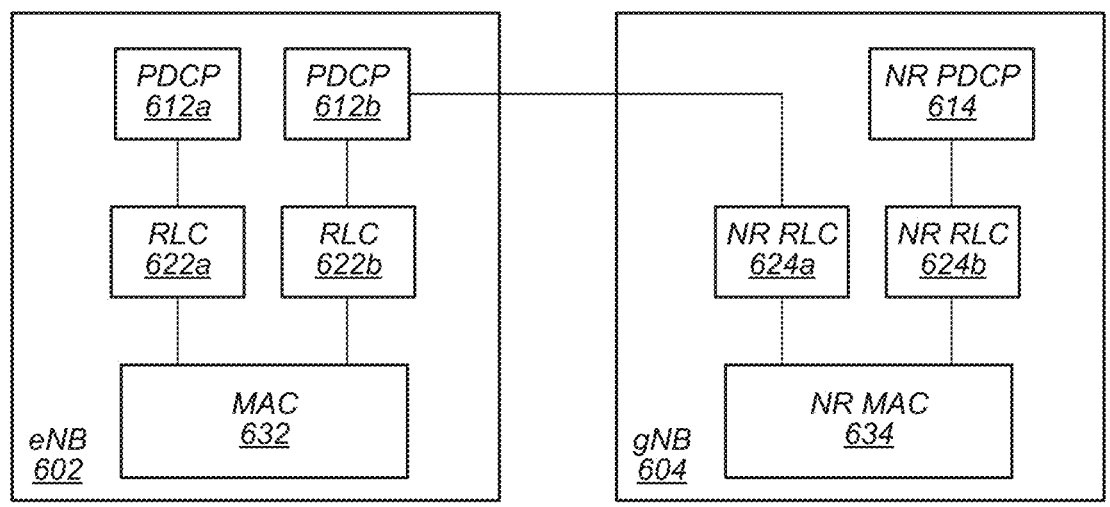
FIG. 6B illustrates an example of a protocol stack for an eNB and a gNB.

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622*a-b*. RLC layer 622*a* may also interface with packet data convergence protocol (PDCP) layer 612*a* and RLC layer 622*b* may interface with PDCP layer 612*b*. Similar to dual connectivity as specified in LTE-Advanced Release 12, PDCP layer 612*a* may interface via a master cell group (MCG) bearer with EPC network 600 whereas PDCP layer 612*b* may interface via a split bearer with EPC network 600.

Additionally, as shown, gNB 604 may include a MAC layer 634 that interfaces with RLC layers 624*a-b*. RLC layer 624*a* may interface with PDCP layer 612*b* of eNB 602 via an $X_2$ interface for information exchange and/or coordination (e.g., scheduling of a UE) between eNB 602 and gNB 604. In addition, RLC layer 624*b* may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

5G Core Network Architecture—Interworking with Wi-Fi

Figure 7A:
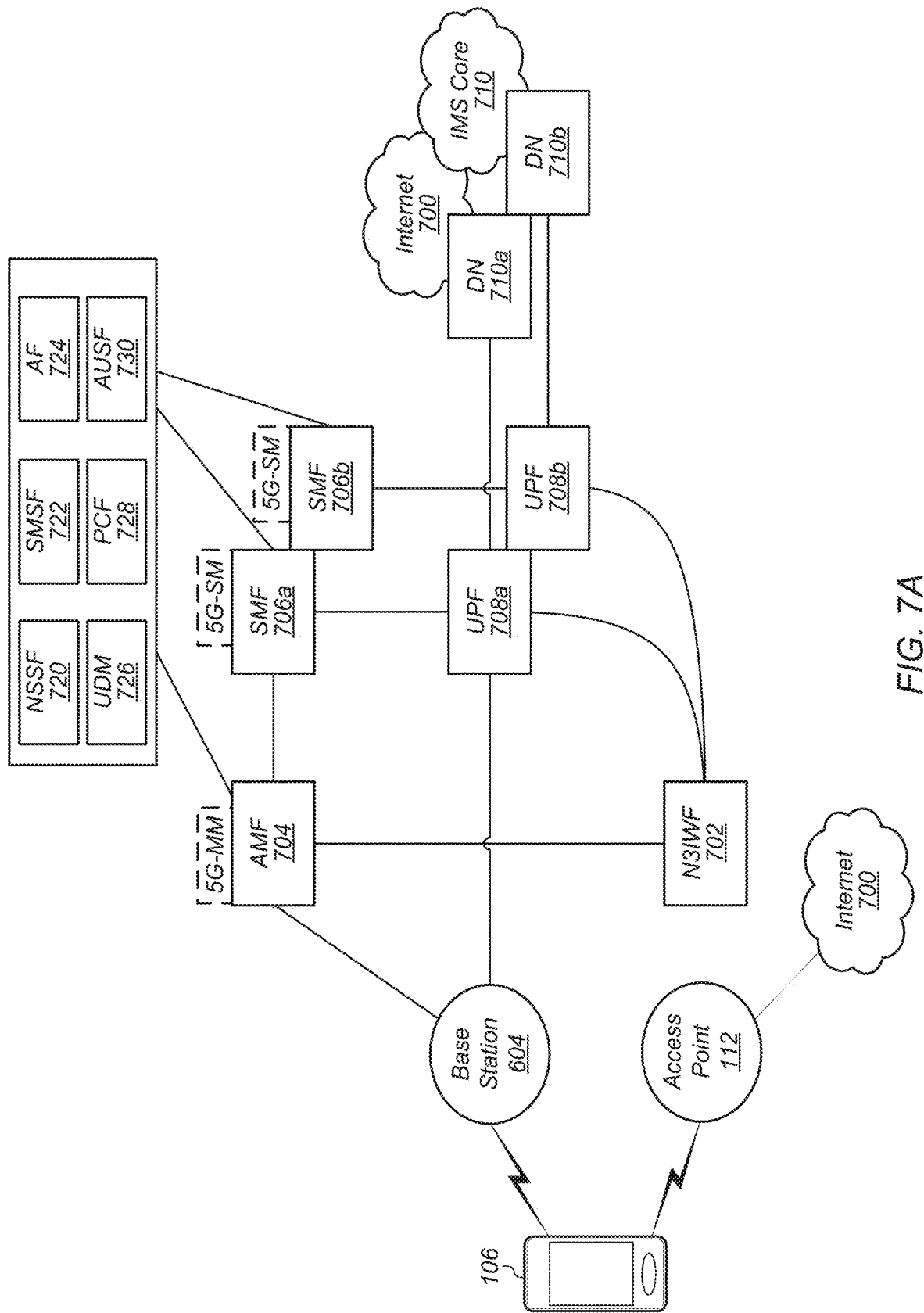
FIG. 7A illustrates an example of a 5G network architecture that incorporates both 3GPP (e.g., cellular) and non-3GPP (e.g., non-cellular) access to the 5G CN, according to some embodiments.

In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 7A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB or base station 604) and an access point, such as AP 112. The AP 112 may include a connection to the Internet 700 as well as a connection to a non-3GPP inter-working function (N3IWF) 702 network entity. The N3IWF may include a connection to a core access and mobility management function (AMF) 704 of the 5G CN. The AMF 704 may include an instance of a 5G mobility management (5G MM) function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. As shown, the AMF 704 may include one or more functional entities associated with the 5G CN (e.g., network slice selection function (NSSF) 720, short message service function (SMSF) 722, application function (AF) 724, unified data management (UDM) 726, policy control function (PCF) 728, and/or authentication server function (AUSF) 730). Note that these functional entities may also be supported by a session management function (SMF) 706*a* and an SMF 706*b* of the 5G CN. The AMF 706 may be connected to (or in communication with) the SMF 706*a*. Further, the gNB 604 may in communication with (or connected to) a user plane function (UPF) 708*a* that may also be communication with the SMF 706*a*. Similarly, the N3IWF 702 may be communicating with a UPF 708*b* that may also be communicating with the SMF 706*b*. Both UPFs may be communicating with the data network (e.g., DN 710*a* and 710*b*) and/or the Internet 700 and IMS core network 710.

Figure 7B:
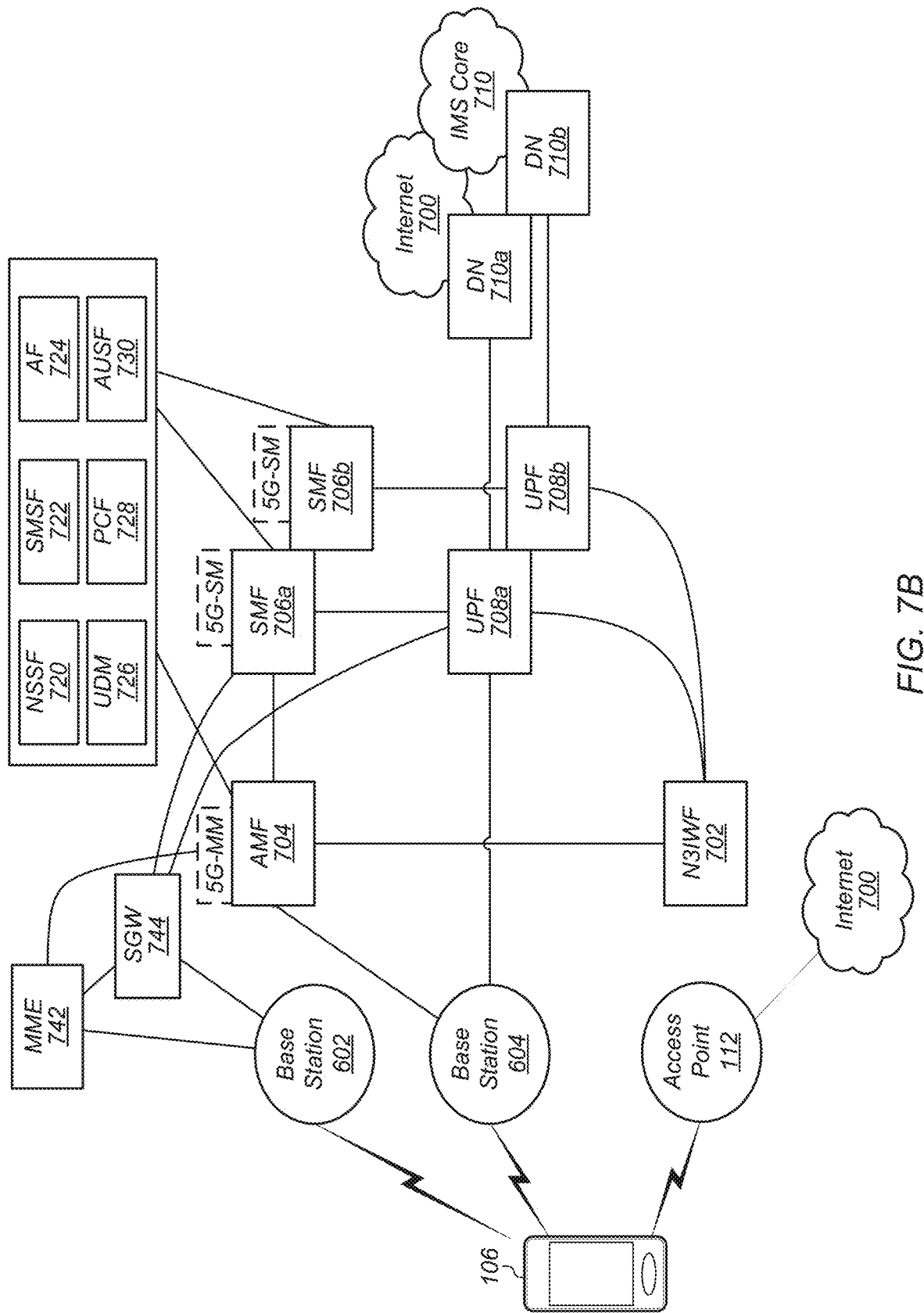
FIG. 7B illustrates an example of a 5G network architecture that incorporates both dual 3GPP (e.g., LTE and 5G NR) access and non-3GPP access to the 5G CN, according to some embodiments.

FIG. 7B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB or base station 604 or eNB or base station 602) and an access point, such as AP 112. The AP 112 may include a connection to the Internet 700 as well as a connection to the N3IWF 702 network entity. The N3IWF may include a connection to the AMF 704 of the 5G CN. The AMF 704 may include an instance of the 5G MM function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. In addition, the 5G CN may support dual-registration of the UE on both a legacy network (e.g., LTE via base station 602) and a 5G network (e.g., via base station 604). As shown, the base station 602 may have connections to a mobility management entity (MME) 742 and a serving gateway (SGW) 744. The MME 742 may have connections to both the SGW 744 and the AMF 704. In addition, the SGW 744 may have connections to both the SMF 706*a* and the UPF 708*a*. As shown, the AMF 704 may include one or more functional entities associated with the 5G CN (e.g., NSSF 720, SMSF 722, AF 724, UDM 726, PCF 728, and/or AUSF 730). Note that UDM 726 may also include a home subscriber server (HSS) function and the PCF may also include a policy and charging rules function (PCRF). Note further that these functional entities may also be supported by the SMF 706*a* and the SMF 706*b* of the 5G CN. The AMF 706 may be connected to (or in communication with) the SMF 706*a*. Further, the gNB 604 may in communication with (or connected to) the UPF 708*a* that may also be communication with the SMF 706*a*. Similarly, the N3IWF 702 may be communicating with a UPF 708*b* that may also be communicating with the SMF 706*b*. Both UPFs may be communicating with the data network (e.g., DN 710*a* and 710*b*) and/or the Internet 700 and IMS core network 710.

Note that in various embodiments, one or more of the above described network entities may be configured to enhance system performance (e.g., UL throughput) without impinging on (e.g., tightening) processing timeline for UL-SCH data and/or CSI reporting, e.g., as further described herein.

Figure 8:
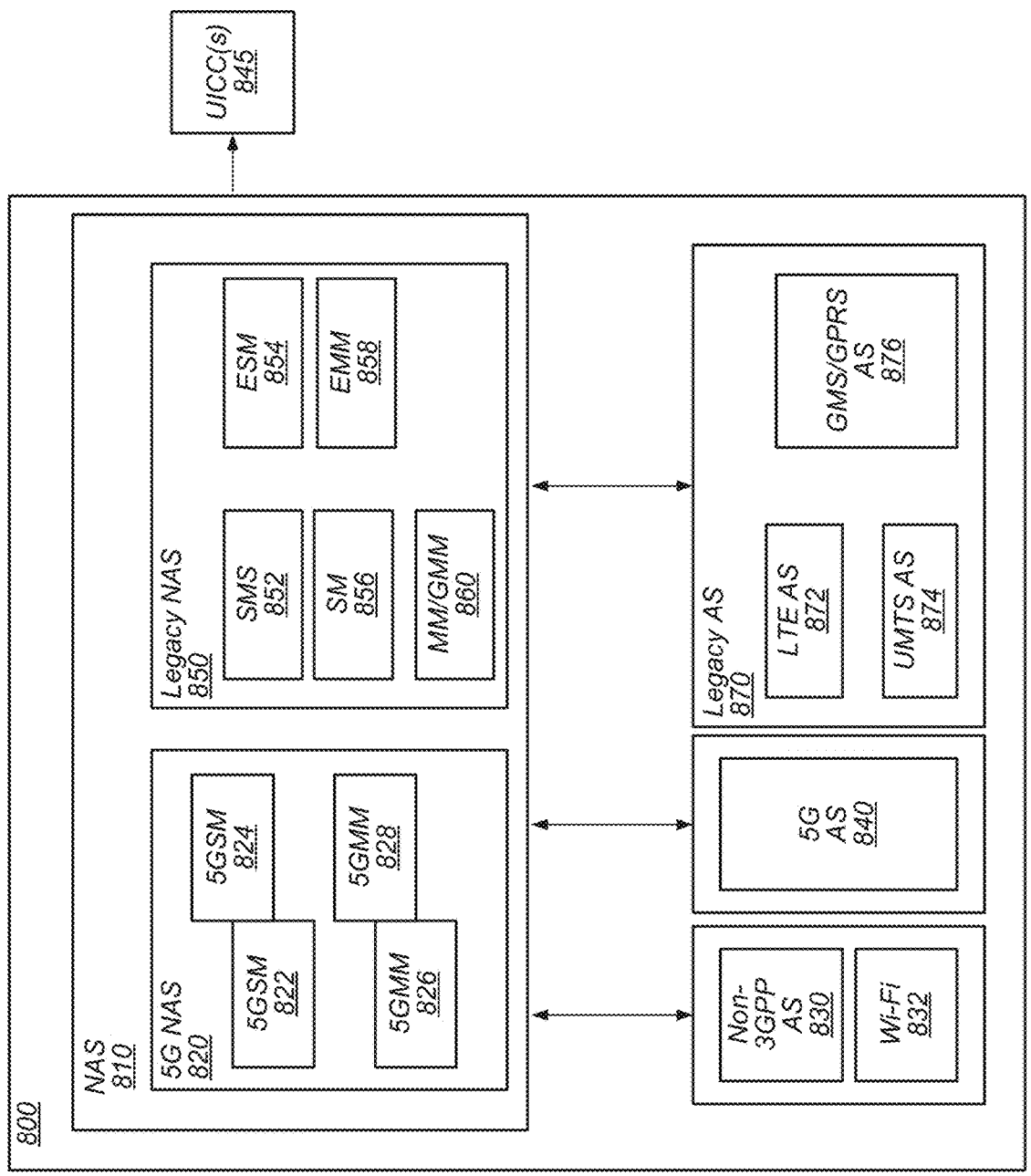
FIG. 8 illustrates an example of a baseband processor architecture for a UE, according to some embodiments.

FIG. 8 illustrates an example of a baseband processor architecture for a UE (e.g., such as UE 106), according to some embodiments. The baseband processor architecture 800 described in FIG. 8 may be implemented on one or more radios (e.g., radios 329 and/or 330 described above) or modems (e.g., modems 510 and/or 520) as described above. As shown, the non-access stratum (NAS) 810 may include a 5G NAS 820 and a legacy NAS 850. The legacy NAS 850 may include a communication connection with a legacy access stratum (AS) 870. The 5G NAS 820 may include communication connections with both a 5G AS 840 and a non-3GPP AS 830 and Wi-Fi AS 832. The 5G NAS 820 may include functional entities associated with both access stratums. Thus, the 5G NAS 820 may include multiple 5G MM entities 826 and 828 and 5G session management (SM)

entities 822 and 824. The legacy NAS 850 may include functional entities such as short message service (SMS) entity 852, evolved packet system (EPS) session management (ESM) entity 854, session management (SM) entity 856, EPS mobility management (EMM) entity 858, and mobility management (MM)/GPRS mobility management (GMM) entity 860. In addition, the legacy AS 870 may include functional entities such as LTE AS 872, UMTS AS 874, and/or GSM/GPRS AS 876.

Thus, the baseband processor architecture 800 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described functional entities of the 5G NAS and/or 5G AS may be configured to perform methods to enhance system performance (e.g., UL throughput) without impinging on (e.g., tightening) processing timeline for UL-SCH data and/or CSI reporting, e.g., as further described herein.

UCI Multiplexing Enhancements

In current implementations, slot aggregation and/or physical uplink shared channel (PUSCH) repetition may be used to enhance uplink transmission reliability, e.g., such as for ultra-reliable and low latency communication (URLLC) between a base station and a wireless device as being specified by 3GPP Release 15, Release 16, and beyond. However, with PUSCH processing timelines in these specifications, timely channel state information (CSI) reporting may be an issue as physical uplink shared channel (PUSCH) transmission with repetition may block CSI reporting, at least in some cases.

Figure 9:
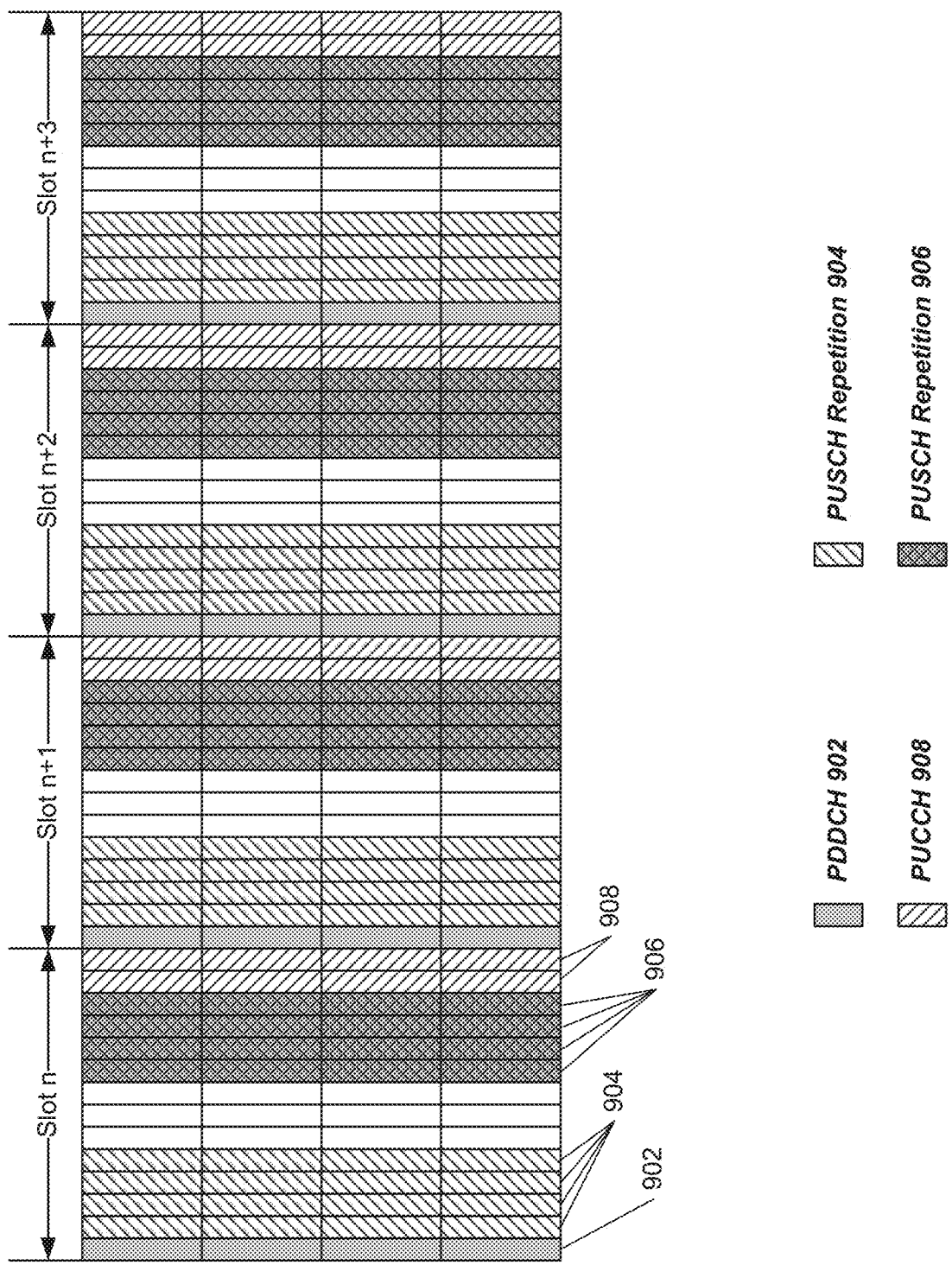
FIG. 9 illustrates an example of a scheduling diagram for 3GPP Release 15 PUSCH slot aggregation.

In some implementations, e.g., such as specified by 3GPP Release 15, PUSCH slot aggregation (e.g., data transmission scheduling that may span one or multiple slots) may be configured via radio resource control (RRC) signaling, e.g., between a base station and a mobile station. In such implementations, each transmission may be a single layer transmission and a single uplink downlink control information (DCI) can trigger the mobile station to transmit over a specified, e.g., k, number of slots. In some implementations, a slot (or set of slots in case of slot aggregation) may be front-loaded with control signals and reference signals to obtain low latency. For example, as shown in FIG. 9, multiple slots (e.g., where each slot includes one or more symbols, such as Orthogonal Frequency Division Multiplexing (OFDM) symbols) may be scheduled such that physical downlink control channel signaling (PDCCH) 902 occurs at a beginning of a slot (e.g., in a first symbol and/or a first set of symbols) and physical uplink control channel signaling (PUCCH) 908 occurs at an end of a slot (e.g., in a last symbol and/or last set of symbols, thereby allowing PUSCH signaling (e.g., PUSCH repetition 904 and PUSCH repetition 906) to occur in the remaining portions of the slots (e.g., remaining symbols and/or remaining sets of symbols). As shown, multiple slots (e.g., slot n through slot n+3) may be scheduled in repetition. In other words, a single DCI may trigger the mobile station to transmit over slots n through n+3, where each slot includes 14 OFDM symbols.

Figure 10:
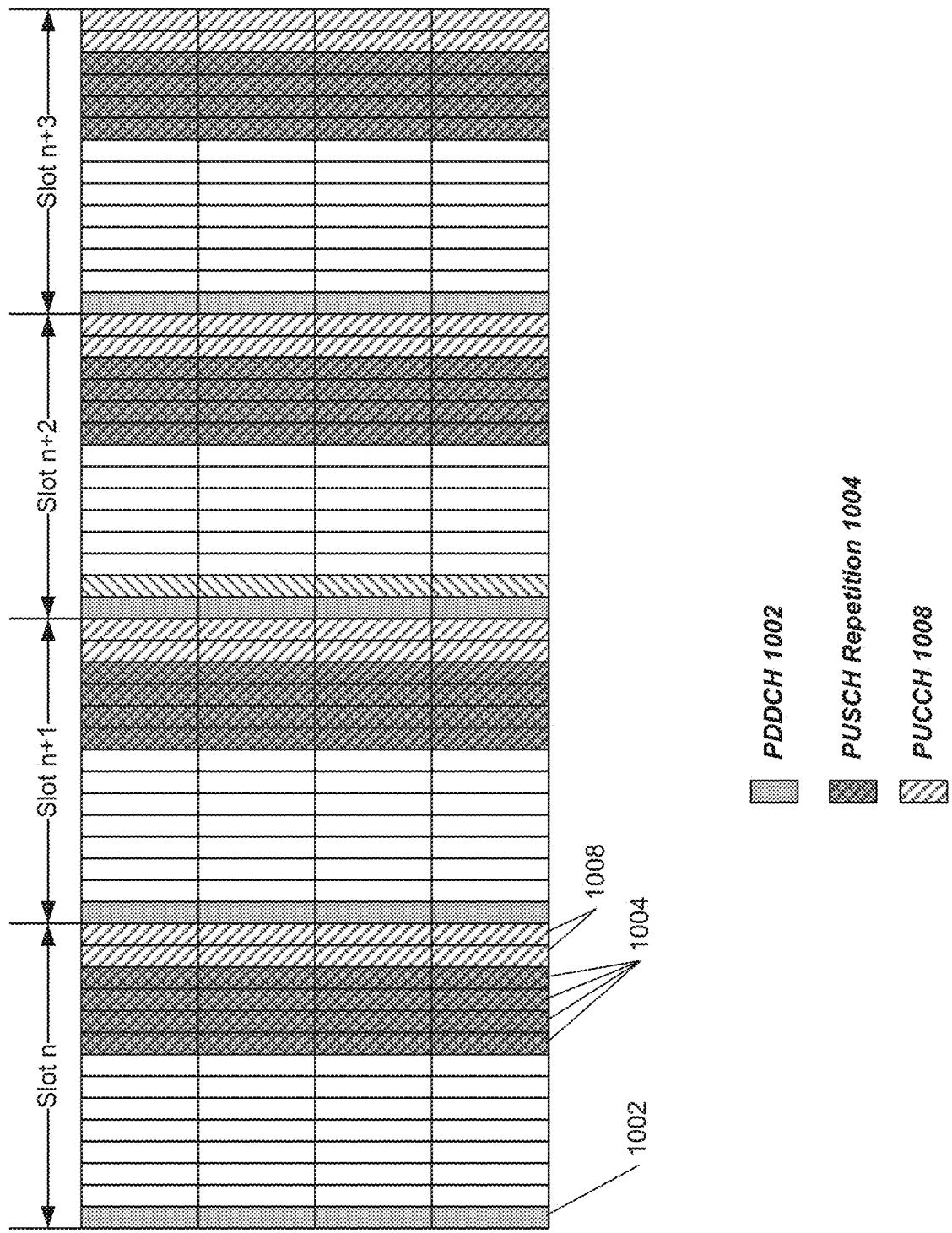
FIG. 10 illustrates an example of a scheduling diagram for a 3GPP Release 15 PUSCH configured grant.

In addition, in some implementations, e.g., such as specified by 3GPP Release 15, two types of configured grants may be supported. For example, a type 1 grant may be defined as a grant in which all transmission parameters are configured by RRC signaling. As another example, a type 2 grant may be defined as a grant in which some transmission parameters may be configured by RRC signaling and some transmission parameters may be activated via a DCI. In some implementations, e.g., as illustrated by FIG. 10, repetition can also be configured via RRC signaling and may be combined, in some implementations, with slot aggregation. Thus, as shown in FIG. 10, slots may be configured (scheduled) to include a first symbol (or set of symbols) for PDDCH signaling 1002, a last two symbols (or a last set of two symbols) for PUCCH signaling 1008, and 4 symbols (or 4 sets of symbols) for PUSCH repetition 1004 (e.g., as configured via RRC signaling).

Figure 11:
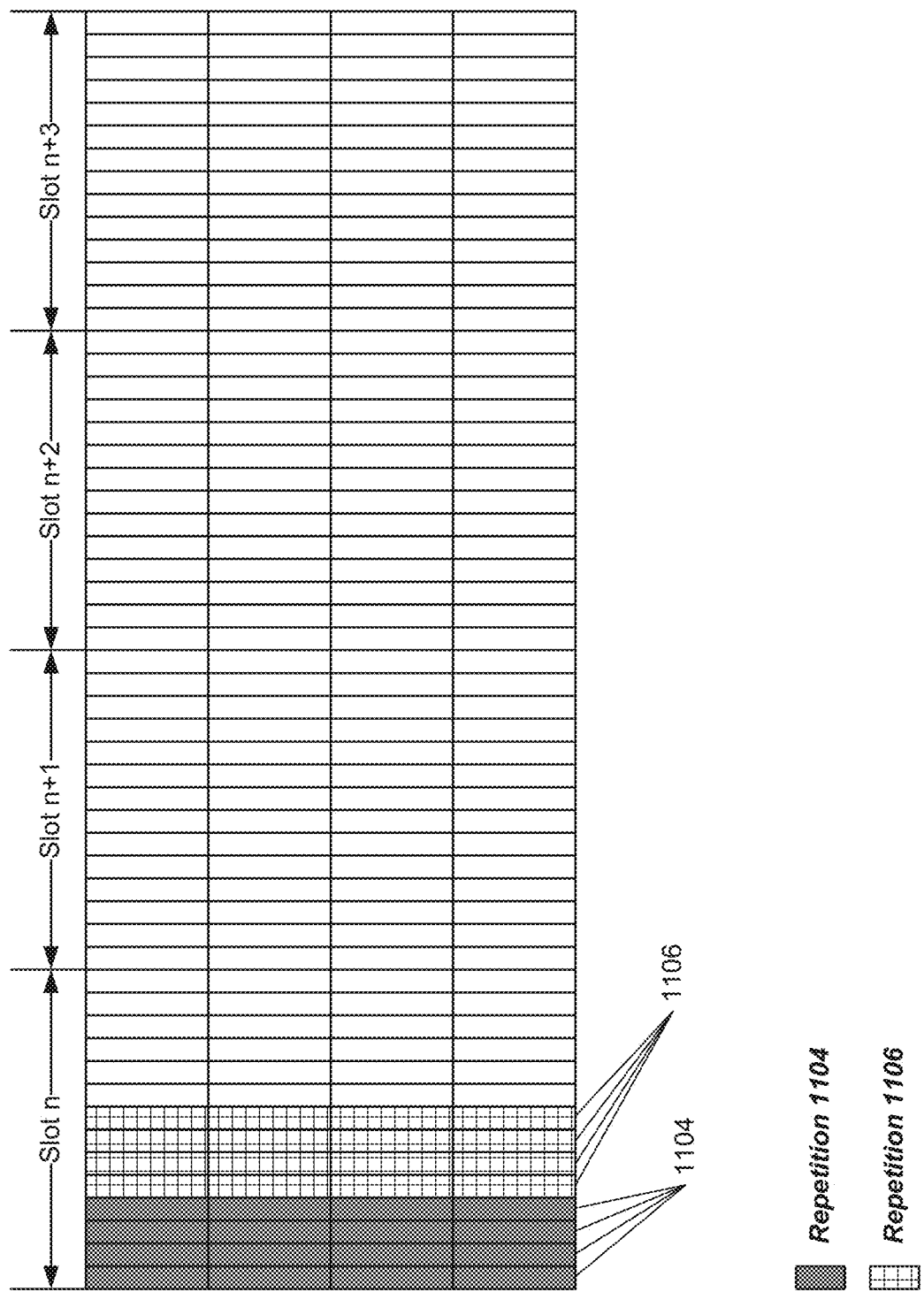
FIGS. 11 and 12 illustrate examples of scheduling diagrams for 3GPP Release 16 PUSCH repetitions.
Figure 12:
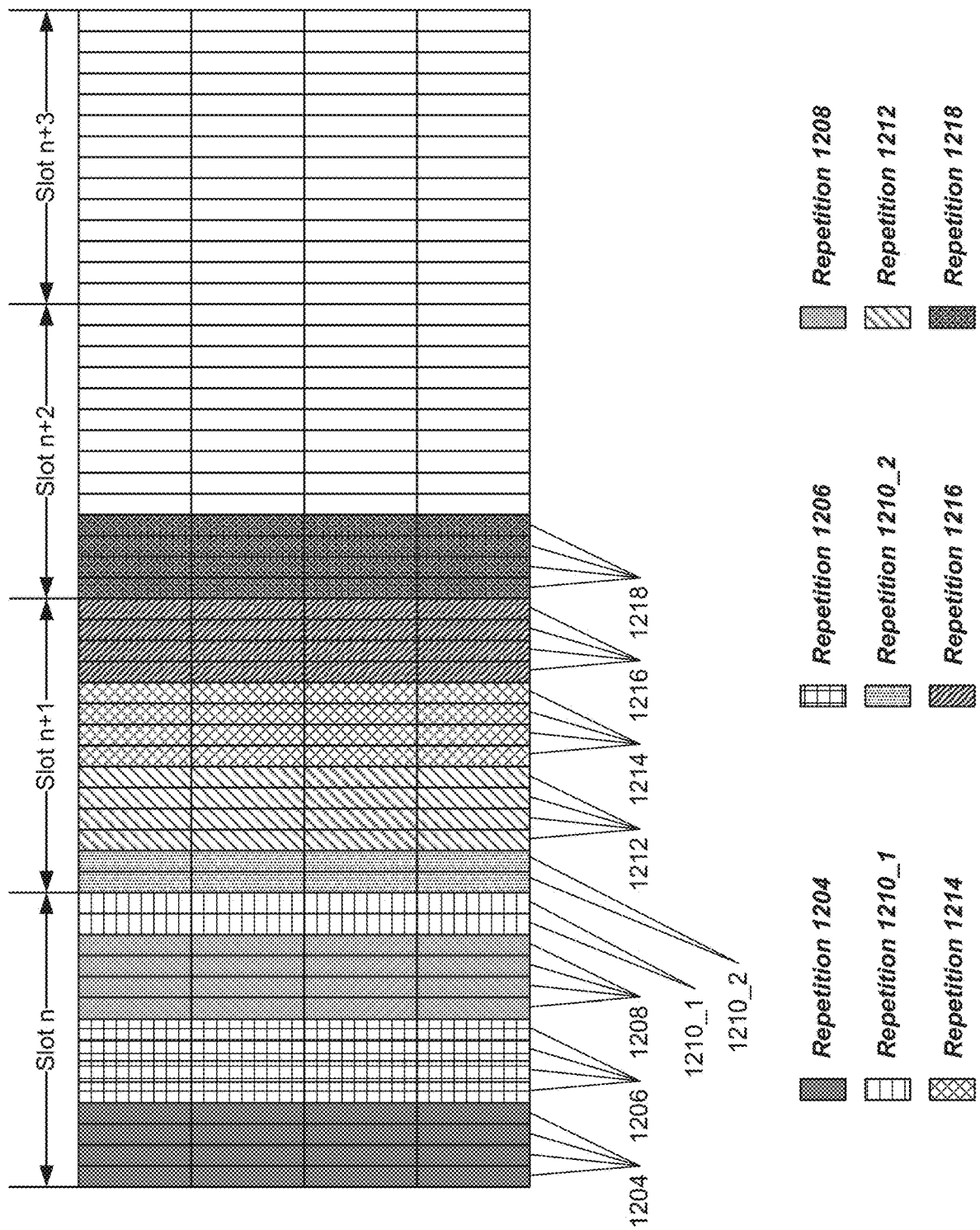

Additionally, in some implementations, e.g., such as specified by 3GPP Release 16, repetitions may occur in a single slot (e.g., as illustrated by FIG. 11) or span multiple slots (e.g., as illustrated by FIG. 12). In such implementations, each PUSCH repetition transmission may be referred to by repetition index (e.g., if there is no segmentation for the repetition as illustrated in FIG. 11, e.g., repetitions 1104 and 1106) or by repetition index and segment index (e.g., if there is segmentation for the repetition as illustrated in FIG. 12, e.g., repetitions 1210_1 and 1210_2 as opposed to repetitions 1204, 1206, 1208, 1212, 1214, 1216, and/or 1218). Thus, in some implementations, a repetition version may span slots.

In some implementations, a repetition number, e.g., which may indicate a number of slots over which PUSCHs are transmitted with a prescribed number for the same transport block, may be signaled by PDCCH dynamically to the wireless device. For example, as introduced in 3GPP Release 16 ultra-reliable and low latency communication (URLLC) enhancements. In some implementations, a duration of each repetition counted in OFDM symbols can be smaller than, equal to, and/or larger than 14.

In some implementations, the PDCCH may trigger the wireless device to transmit PUSCHs with different transport blocks over consecutive slots or consecutive L symbols. In some implementations, the number of OFDM symbols utilized by the first PUSCH or the last PUSCH may be smaller than the number of OFDM symbols utilized by other PUSCHs, for example as encountered in unlicensed spectrum access.

Figure 13:
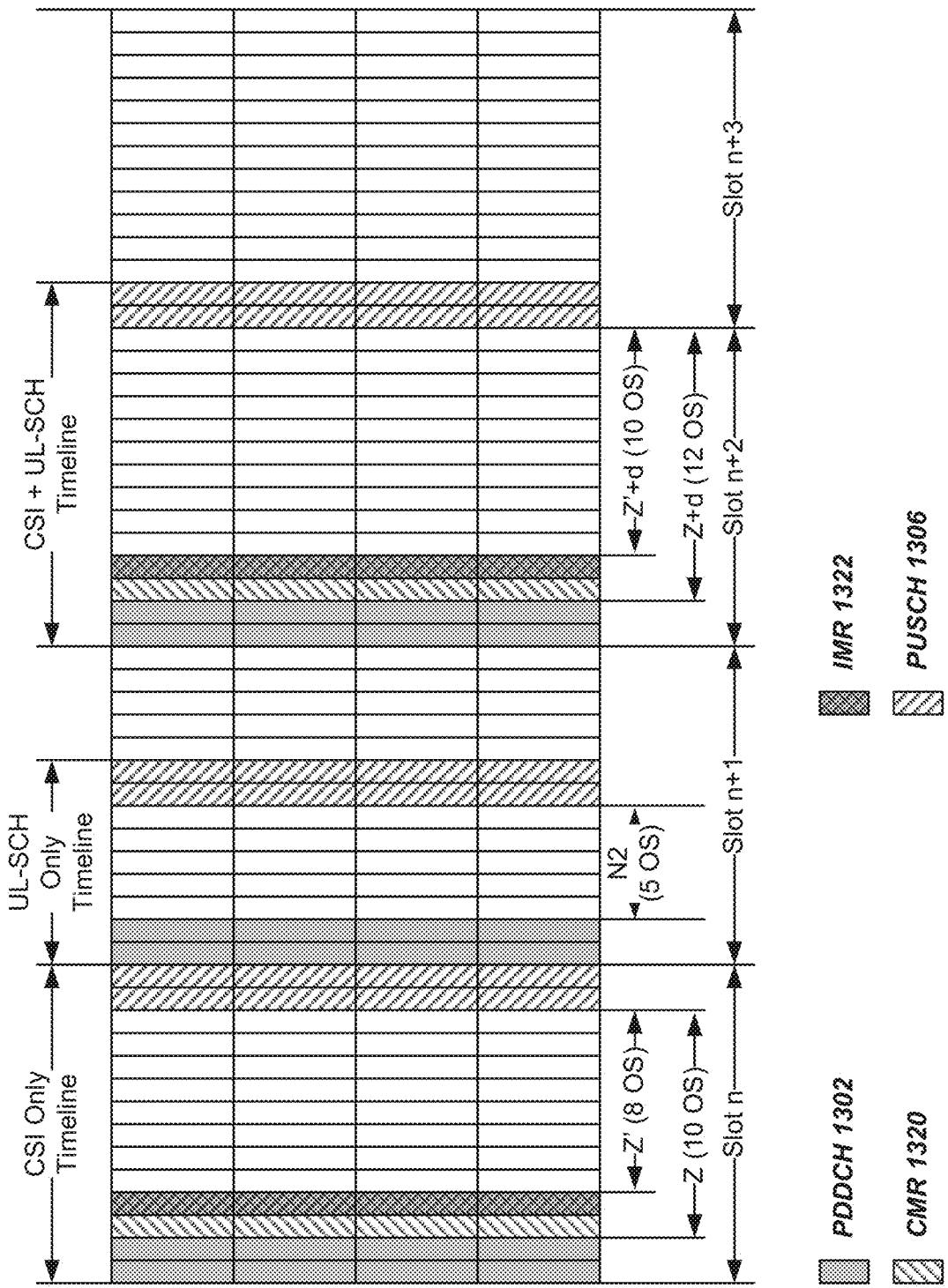
FIG. 13 illustrates examples of scheduling diagrams for a 3GPP Release 15 CSI timeline, a 3GPP Release 15 UL-SCH timeline, and a 3GPP Release 15 CSI and UL-SCH combined timeline.

Further, in some implementations, e.g., such as specified by 3GPP Release 15, a wireless device may have a specified timeline for certain actions. For example, FIG. 13 illustrates scheduling diagrams for a wireless device to provide a channel state information (CSI) report (e.g., slot n), for the wireless device to transmit uplink shared channel (UL-SCH) data, e.g., transmission of RRC signaling and/or application data (e.g., slot n+1), and for the wireless device to transmit UL-SCH data and provide a CSI report(s) (e.g., slots n+2 and n+3). As shown in slot n, a CSI timeline may include two orthogonal frequency-division multiplexing (OFDM) symbols (or sets of OFDM symbols) for receiving on a physical downlink control channel (PDCCH), e.g., PDCCH 1302, 1 OFDM symbol (or set of OFDM symbols) for receiving a channel measurement resource (CMR), e.g., CMR 1320, and 1 OFDM symbol (or set of OFDM symbols) for receiving an interference measurement resource (IMR), e.g., IMR 1322. The wireless device may then require 8 OFDM symbols (or sets of symbols) for preparation of the CSI report (e.g., Z') to be transmitted on the PUSCH 1306.

In other words, the wireless device may require 10 OFDM symbols (or sets of symbols) after receiving on the PDCCH for preparation of the CSI report (e.g., Z). As shown in slot n+1, an UL-SCH timeline may include 2 OFDM symbols (or sets of symbols) for receiving on the PDCCH followed by 5 OFDM symbols (or sets of symbols) for preparing UL-SCH data (e.g., Z) to be transmitted on the PUSCH. As shown in slot n+2 (and continuing into slot n+3) a CSI+UL-SCH timeline may include 2 OFDM symbols (or sets of symbols) for receiving on the PDCCH followed by 1 OFDM symbol (or sets of symbols) each for the CMR and IMR. The wireless device may then require 10 OFDM symbols (or sets of symbols) for preparation of the CSI report(s) and the UL-SCH data to be transmitted on the PUSCH after receiving the IMR. In other words, the wireless device may require 12 OFDM symbols (or sets of symbols) (e.g., Z+d) after receiving on the PDCCH for preparation of the CSI report(s) and the UL-SCH data.

As shown in FIG. 13, PUSCH transmissions without CSI reporting can be processed much faster (5 OFDM symbols) as compared to PUSCH transmissions with CSI reporting. Thus, if a base station requires a wireless device to send a fresh (e.g., new/updated) CSI report(s) and UL-SCH data simultaneously (e.g., as part of a single scheduling grant), the minimum allowable scheduling time between the PDCCH and the PUSCH becomes much larger as compared to not preparing a CSI report(s). Thus, in some instances, the base station may be required to choose (and/or balance) between fast UL data transmission (e.g., omitting CSI report(s)) and updated/new (e.g., fresh) downlink CSI report(s).

Embodiments described herein provide system, methods, and mechanisms for a UE, such as UE 106, and a base station, such as base station 102 and/or gNB 604, to enhance system performance (e.g., UL throughput) without impinging on (e.g., tightening) the UE's processing timeline for UL-SCH data and/or CSI reporting. Some embodiments may be implemented as part of ultra-reliable and low latency communication (URLLC) between the base station and the UE. URLLC is a category of cellular communication under development at least with respect to 3GPP fifth generation (5G) new radio (NR) communication (e.g., 3GPP Release 15, 16 and beyond). According to some embodiments, URLLC may have extremely low latency and high reliability requirements, e.g., such as less than 0.001% packet error rate at a 1 ms delay bound. Note, though, that while URLLC having 0.001% packet error rate at a 1 ms delay bound as a requirement may represent one possible example of a scenario in which high reliability low latency communication may be desirable, other possible latency and reliability requirements for URLLC may also be possible, and also that other types of cellular communication may also have very high reliability and low latency requirements and so may also benefit from the techniques described herein, at least according to some embodiments.

Figure 14:
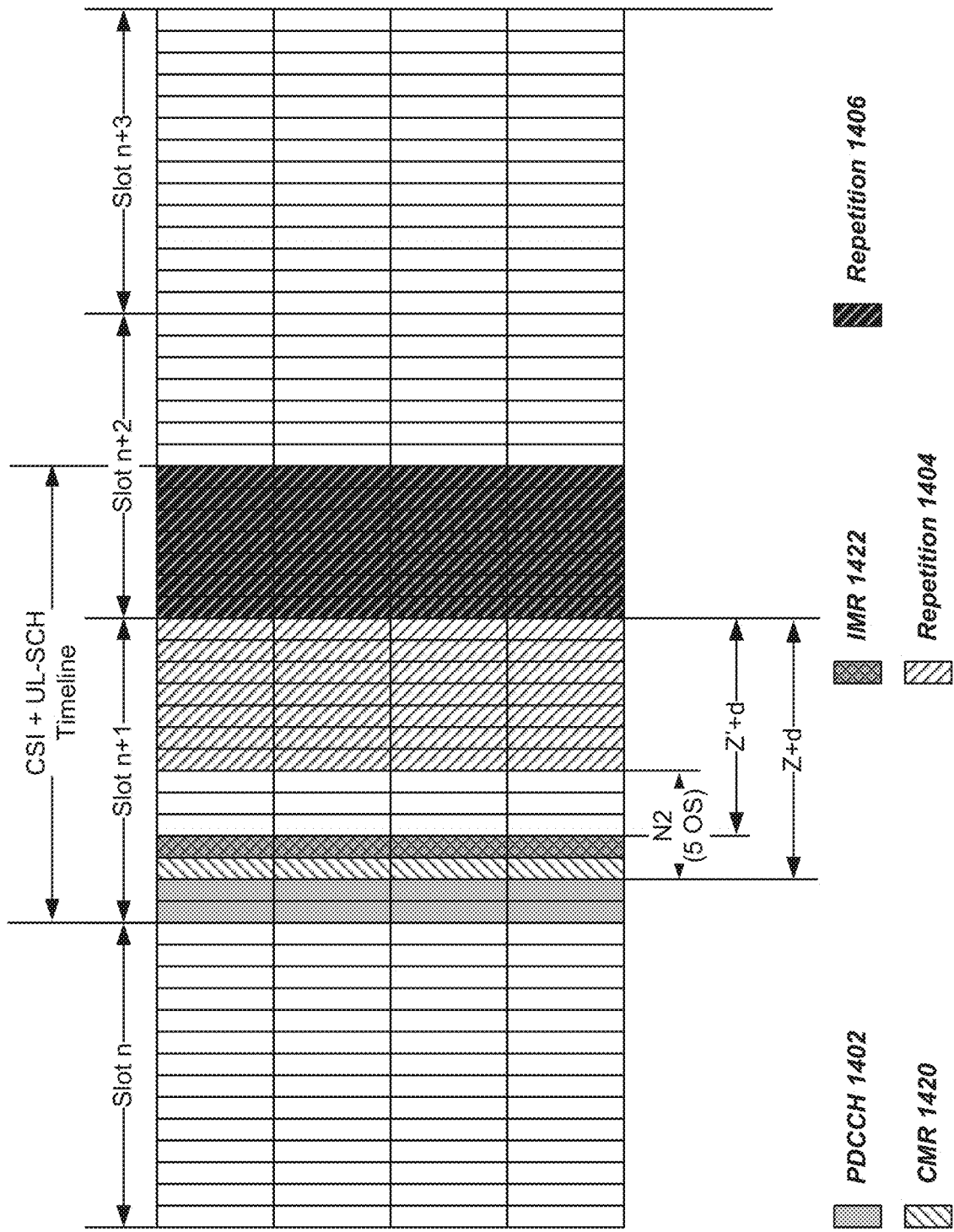
FIG. 14 illustrates an example of a scheduling diagram for a combined CSI and UL-SCH timeline, according to some embodiments.
Figure 15:
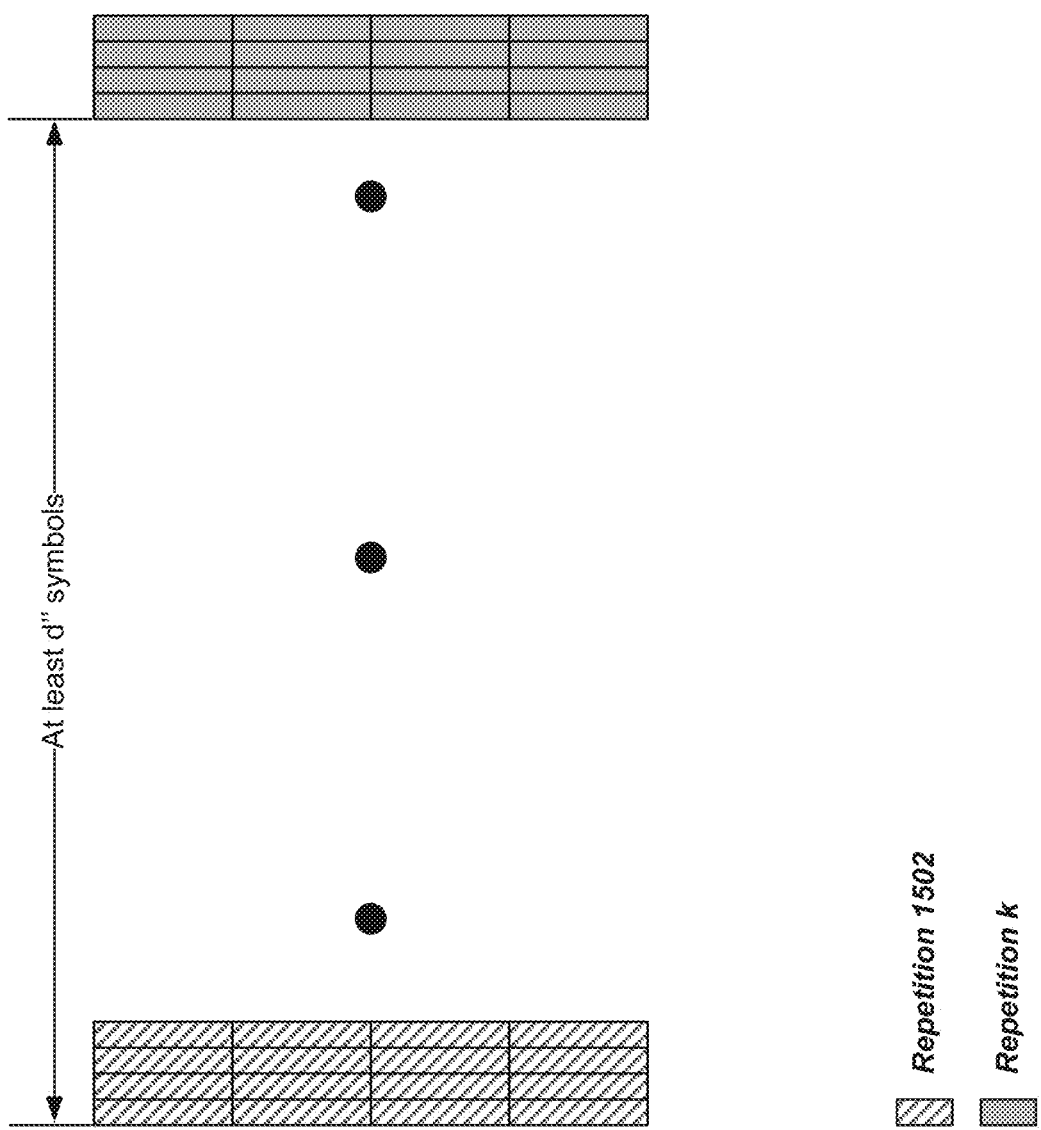
FIG. 15 illustrates another example of a scheduling diagram for a combined CSI and UL-SCH timeline, according to some embodiments.

In some embodiments, PUSCH repetition may be exploited such that a CSI report(s) is not multiplexed on a first repetition, but instead, on a later repetition. For example, FIG. 14 illustrates an example in which a CSI report(s) is multiplexed on a second repetition, e.g., the CSI report(s), triggered by PDCCH 1402 and based on CMR 1420 and IMR 1422, may be multiplexed on repetition 1406 as opposed to (or instead of) repetition 1404. Note that in some embodiments, 3GPP Release 15 and/or 16 timelines (and/or timelines of further 3GPP releases) may be enforced and/or maintained on a per-repetition basis, hence, such multiplexing of the CSI report(s) (e.g., on repetition 1406 instead of (or opposed to) repetition 1404) may not violate a standardized timeline. In some embodiments, there may be multiple candidate positions (e.g., within PUSCH repetitions) to insert (or multiplex) an UL DCI. Thus, in some embodiment, one or more rules may be introduced to determine on which repetition a CSI report(s) may be multiplexed. For example, in some embodiments, a difference between an N2 value and a Z value, for each subcarrier spacing (SCS), may be used to identify an earliest possible repetition that satisfies an imposed minimum timeline, e.g., with a first symbol at least d" symbols after a first symbol of a first repetition (e.g., as illustrated by FIG. 15). For example, as illustrated by FIG. 15, a first symbol d" symbols after a first symbol of repetition 1502 may occur in repetition k. In other words, the earliest possible repetition may be identified as the repetition in which the first symbol is at least d" symbols after PDCCH monitoring. Note that in some embodiments, as the N2 value differs for different UE uplink processing capabilities, d" may be based on (and/or depend on) N2 (and/or uplink processing time capability) and/or SCS. In some embodiments, the last repetition may be identified as the repetition on which the CSI report(s) may be multiplexed. In some embodiments, d" may be defined as 5 symbols for 15 KHz SCS, 7.5 symbols for 30 KHz SCS, and/or 13 symbols for 60 KHz SCS.

Figure 16:
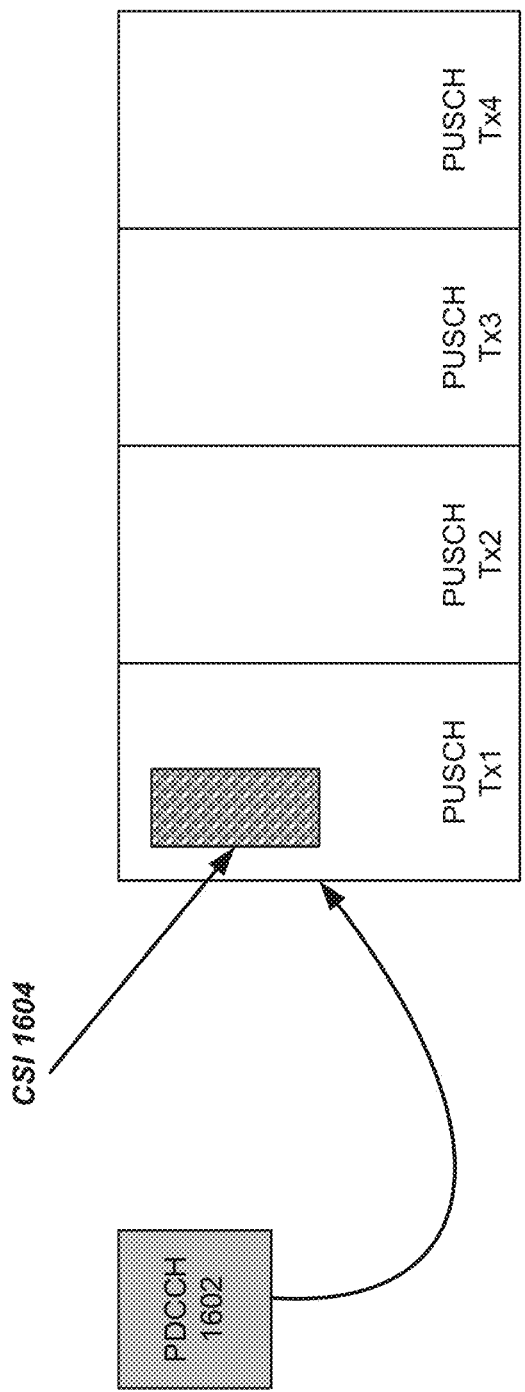
FIG. 16 illustrates an example scheduling diagram of a PUSCH transmission scheme for 3GPP Release 16.
Figure 17:
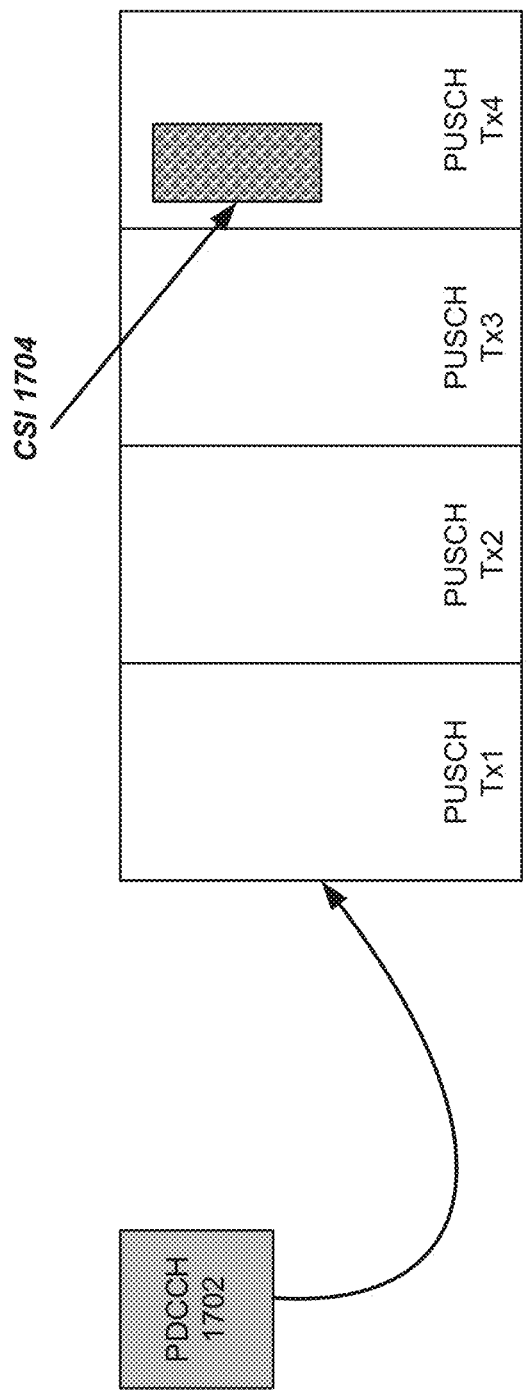
FIG. 17 illustrates an example scheduling diagram of a PUSCH transmission scheme, according to some embodiments.

In some implementations of multi-slot PUSCH or PUSCH with repetition, a first transmission (e.g., a first slot in the multi-slot PUSCH or first PUSCH in PUSCH with repetition) may be designated to carry an aperiodic CSI report(s), e.g., as illustrated by FIG. 16. As shown, PUSCH Tx1, which is the first PUSCH transmission after PDCCH 1602, may include CSI 1604 (e.g., CSI 1604 may be multiplexed onto PUSCH Tx1). However, to improve throughput, in some embodiments, a later transmission may be designated (and/or) used to carry an aperiodic CSI report(s), e.g., as illustrated by FIG. 17. For example, as shown, PUSCH Tx4, which is not the first PUSCH transmission after PDCCH 1702, may include CSI 1704 (e.g., CSI 1704 may be multiplexed onto PUSCH Tx4). In some embodiments, using (and/or designating) the later transmission may potentially provide more processing time for a UE to generate updated CSI report(s)s. In some embodiments, a last slot in a multi-slot transmission and/or a last transmission in PUSCH with repetition may be designated. In some embodiments, a first slot in a multi-slot transmission or a first transmission in PUSCH with repetition which meets a minimum CSI processing timing (e.g., delay requirement 1) may be designated. In some embodiments, RRC signaling may be used to configure a relative slot index/transmission index identifier (ID) for CSI multiplexing. In some embodiments, e.g., with dynamic grants, a slot index/transmission index for an actual CSI multiplexing can be given by a minimum of (K, ID), where K is a number of slot aggregation or number of PUSCH repetition. In some embodiments, a UE may autonomously (e.g., without base station/network input) select a PUSCH repetition in which it transmits a CSI report(s). In such embodiments, the UE may indicate this repetition to the base station dynamically, e.g., by using a different demodulation reference signal (DMRS). In some embodiments, a DMRS used for the PUSCH repetition that is multiplexed with a CSI report(s) may be different from a DMRS used for a PUSCH repetition with UL-SCH channel only.

In some embodiments, to limit loss in reliability of the PDSCH, a length of the PUSCH repetition which carries CSI report(s)(s) may be increased to ensure that a coding rate of the PUSCH is not changed. Note that such an increase may alter (or move) starting positions of subsequent repetitions.

Figure 18:
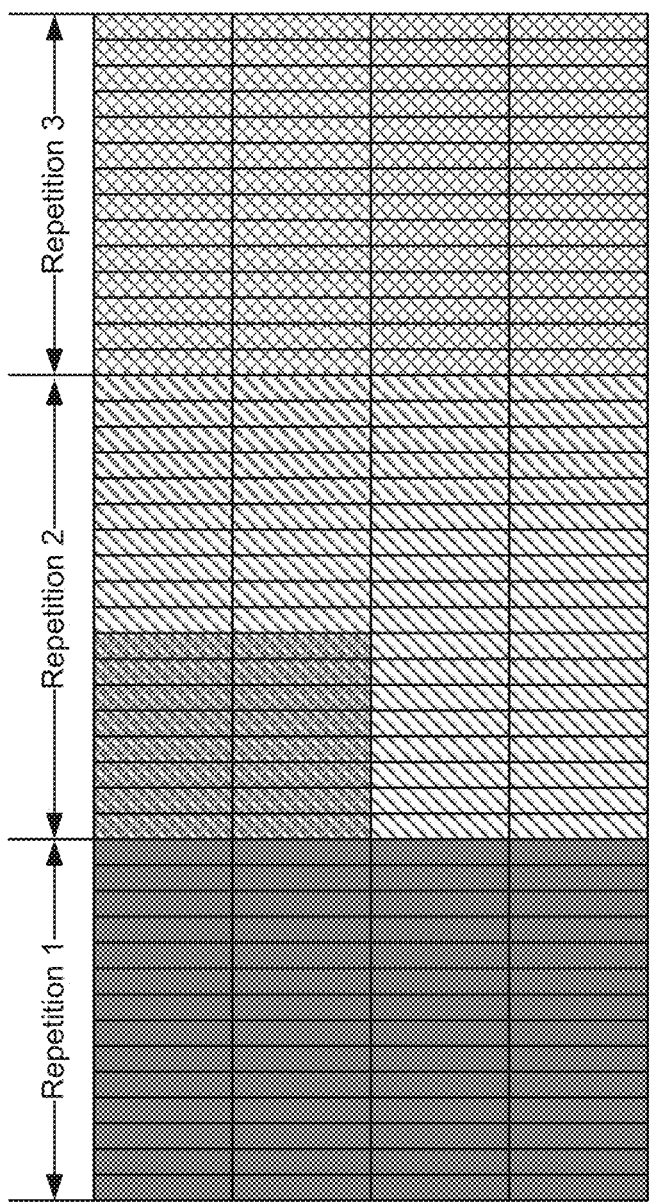
FIGS. 18-21 illustrate further examples of scheduling diagram of a PUSCH transmission scheme, according to some embodiments.
Figure 19:
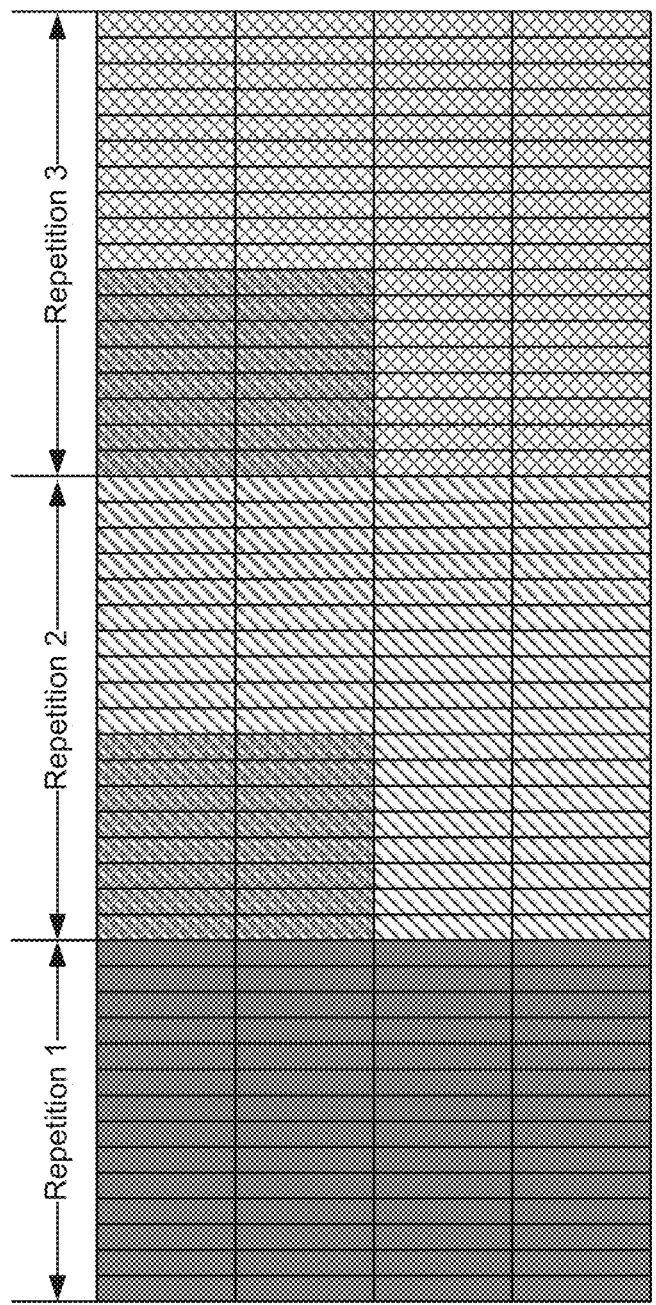

In some embodiments, as illustrated by FIG. 18, subsequent repetitions may carry only PUSCH transmissions, e.g., repetitions after the repetition with the CSI multiplexed onto it may carry only PUSCH transmission). As shown by FIG. 18, repetitions 1 and 3 may have a standard (or same) length, e.g., as measured in symbols and/or sets of symbols, however, repetition 2, which includes CSI 1810, may have an increased length to compensate for the multiplexing of CSI 1810. In some embodiments, as illustrated by FIG. 19, subsequent repetitions may carry both PUSCH transmissions and CSI-report(s). As shown by FIG. 19, repetition may have a standard length, e.g., as measured in symbols and/or sets of symbols, however, repetitions 2 and 3, which each includes CSI 1910, may have increased lengths to compensate for the multiplexing of CSI 1910. Note that such a scheme may increase reliably of the CSI report(s) 1910, e.g., as compared to reliability of CSI 1810. In some embodiments, a number of repetitions with CSI multiplexing may be different from a total number of subsequent CSI repetitions. In some embodiments, this scheme may be implemented while keeping PUSCH repetition length unchanged.

Figure 20:
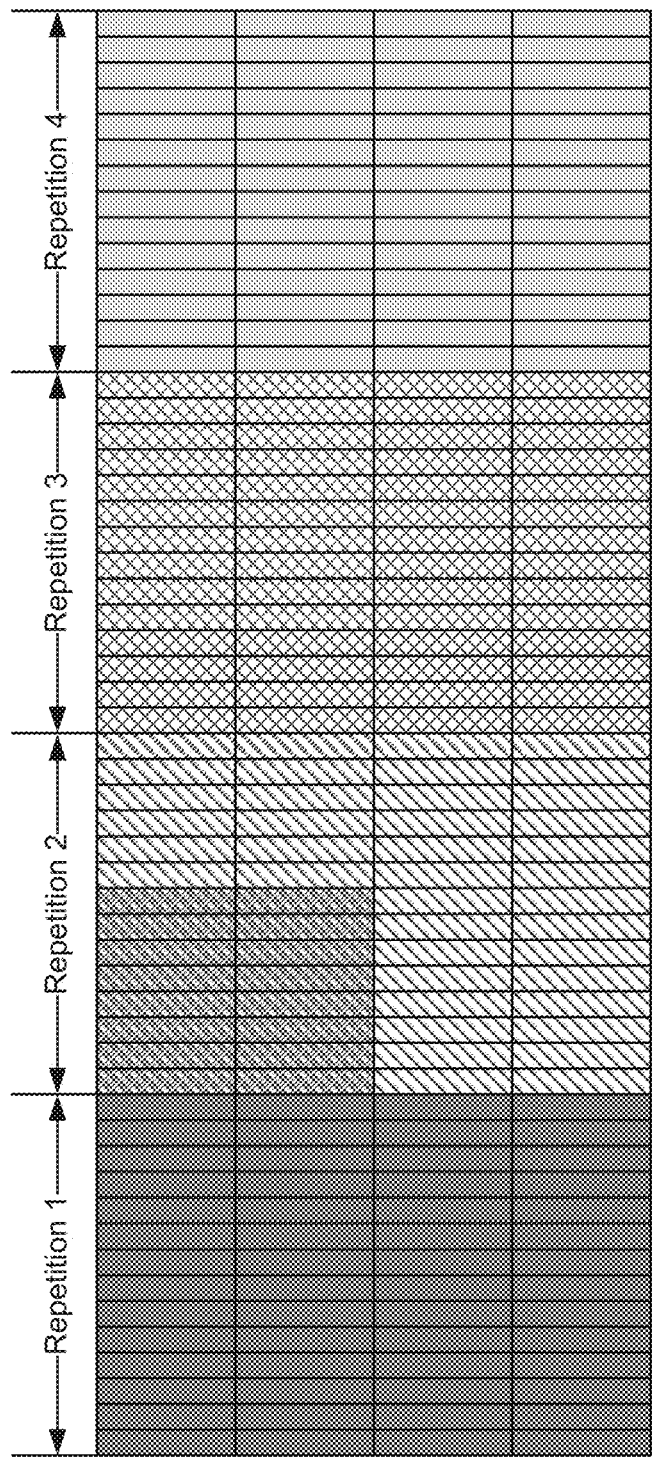

In some embodiments, to limit loss in reliability of the PDSCH, one or more additional repetitions may be added to a total number of PUSCH repetitions to ensure that reliability of the PUSCH transmission is not negatively impacted by multiplexing a CSI report(s), e.g., as illustrated by FIG. 20. As shown, each repetition 1 to 4 may have a same length, however, since CSI 2020 is multiplexed onto repetition 2, repetition 4 may be added. In some embodiments, a number of extra repetitions may be fixed (and/or configured), e.g., via RRC configuration, may be modified based on rules e.g., via a CSI report(s) size, and/or may be dynamically signaled in a DCI, e.g., via a number of repetitions if CSI is multiplexed.

Figure 21:
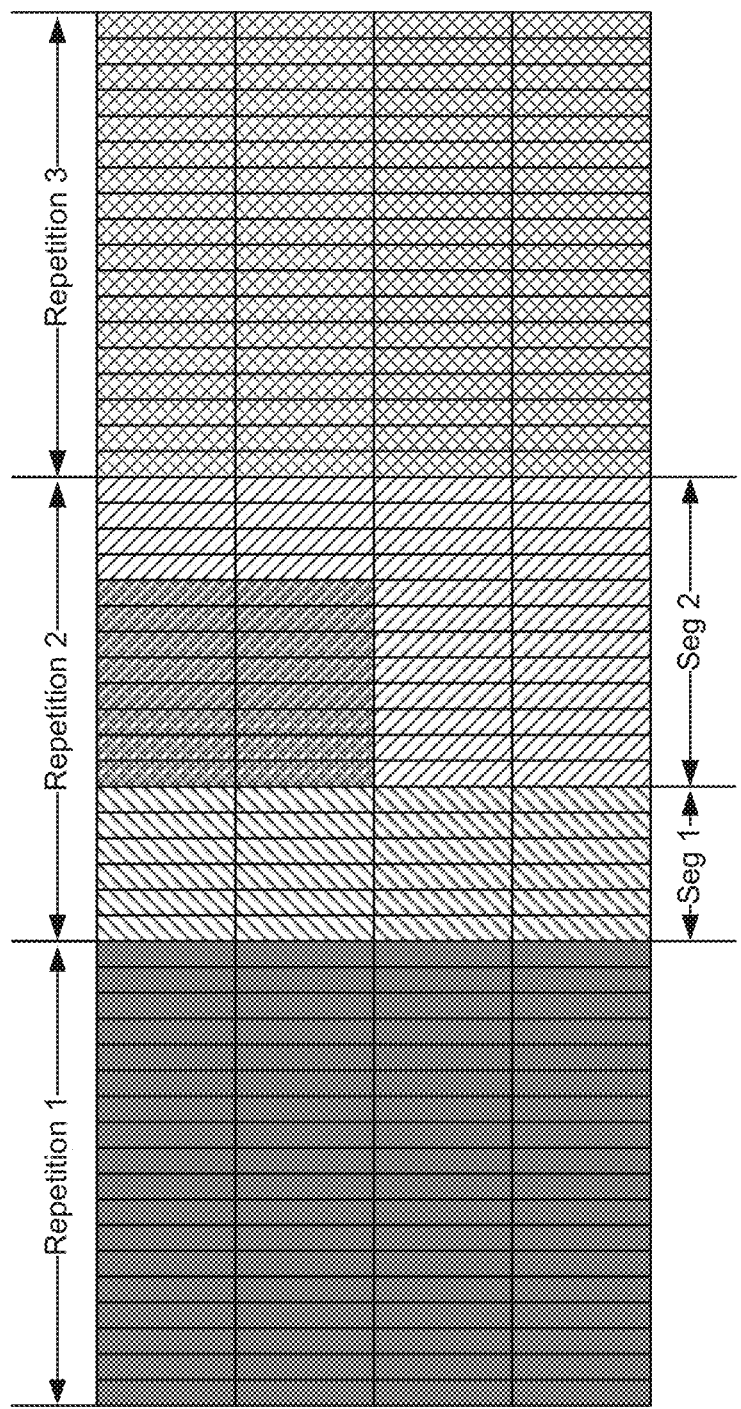

In some embodiments, as it is imperative for a UE to send HARQ ACK to a base station as soon as possible, 3GPP Release 15, 16 and/or beyond HARQ feedback multiplexing can be retained, e.g., HARQ multiplexing over different repetitions/slots for PUSCH. In some embodiments, if an identified nominal repetition where CSI is multiplexed into needs to be segmented, e.g. one small segment and a large segment, to avoid the dilemma of choosing a suitable beta for HARQ ACK and a suitable beta for CSI, the large segment of the identified nominal repetition may be chosen for CSI multiplexing, e.g., as illustrated by FIG. 21. In other words, to avoid segmentation of CSI 2110, it may be multiplexed onto segment 2 of repetition 2 instead of segment 1. In some embodiments, a number of resource elements (Res) for CSI reporting can also be scaled according to a ratio of the number of REs available in a large segment and a number of REs available for a nominal repetition.

Figure 22:
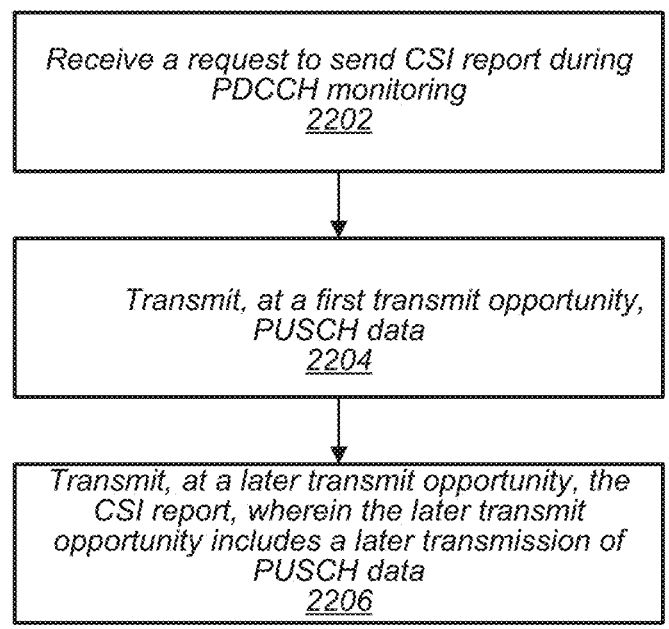
FIG. 22 illustrates a block diagram of an example of a method for enhancing system performance without impinging on a UE's processing timeline for UL-SCH data and/or CSI reporting, according to some embodiments.

FIG. 22 illustrates a block diagram of an example of a method for enhancing system performance without impinging on a UE's processing timeline for UL-SCH data and/or CSI reporting, according to some embodiments. The method shown in FIG. 22 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 2202, a UE, such as UE 106, may receive, from a base station, such as base station 102 and/or gNB 604, a request to send a refreshed (and/or updated and/or new) channel state information (CSI) report, e.g., during monitoring of a physical downlink control channel (PDCCH). In some embodiments, the base station may also request the UE to send (transmit) uplink shared channel (UL-SCH) data.

At 2204, at a first transmit opportunity, the UE may transmit first PUSCH. In some embodiments, the first PUSCH may be a first repetition of data. In some embodiments, the first PUSCH may be a first scheduled transmission of a multi-slot transmission of PUSCH (e.g., with or without repetition). In some embodiments, UL-SCH data may be multiplexed onto the first PUSCH. In some embodiments, the first transmit opportunity may occur at least 5 symbols after completion of the PDCCH monitoring. In some embodiments, the symbols may be OFDM symbols.

At 2206, at a second (or later) transmit opportunity, the UE may transmit second (or later/additional) PUSCH. In some embodiments, the CSI report(s) may be multiplexed onto the second PUSCH. In some embodiments, the second PUSCH may be a second (or later) repetition of data. In some embodiments, the second PUSCH may be a second (or later) scheduled transmission of a multi-slot transmission of PUSCH (e.g., with or without repetition). In some embodiments, the second transmit opportunity may occur at least 12 symbols after completion of the PDCCH monitoring. In some embodiments, the symbols may be OFDM symbols. In some embodiments, e.g., when the second PUSCH may be an additional repetition of PUSCH, a length of the PUSCH may be increased to ensure that a coding rate of the PUSCH is not altered. In some embodiments, e.g., when the second PUSCH may be an additional repetition of PUSCH, an additional repetition of PUSCH may be transmitted to ensure that reliability of the PUSCH transmission is not negatively impacted by the multiplexed CSI report(s).

In some embodiments, the second transmit opportunity may be identified as a transmit opportunity (or repetition) that starts at least a specified number of symbols after a first symbol of the first repetition. In some embodiments, the specified number of symbols may be dependent upon at least one of UE uplink processing time capabilities or subcarrier spacing (SCS).

In some embodiments, the second transmit opportunity may be defined by radio resource control (RRC) signaling. In some embodiments, the RRC signaling may configure a relative slot index/transmission index for CSI multiplexing.

In some embodiments, the second transmit opportunity may be defined by the UE. In such embodiments, the UE may indicate, to the base station, the second transmit opportunity via a demodulation reference signal (DMRS). In some embodiments, the DMRS for the second transmit opportunity may differ from a DMRS for the first transmit opportunity.

In some embodiments, the second transmit opportunity may include a first segment occurring in a first slot and a second segment occurring in a second slot. In such embodiments, the CSI report(s) may be multiplexed onto the larger segment. For example, when the first segment is larger than the second segment, the CSI report(s) may be multiplexed onto the first segment. As another example, when the second segment is larger than the first segment, the CSI report(s) may be multiplexed onto the second segment.

In some embodiments, the UE may transmit (or retransmit) the CSI report(s) onto third (or subsequent later) PUSCH transmitted in a third (or subsequent later) transmit opportunity. In some embodiments, when the second and third PUSCH may be additional repetitions of PUSCH, a length of the PUSCH for the second and third PUSCH may be increased to ensure that a coding rate of the PUSCH is not altered.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
   at least one antenna;
   at least one radio, wherein the at least one radio is configured to perform cellular communication using at least one radio access technology (RAT);
   one or more processors coupled to the at least one radio, wherein the one or more processors and the at least one radio are configured to perform voice and/or data communications;
   wherein the one or more processors are configured to cause the UE to:
      receive, during monitoring of a physical downlink control channel (PDCCH), a request to send uplink shared channel (UL-SCH) data and one or more channel state information (CSI) reports;
      transmit, at a first transmit opportunity, the UL-SCH data, wherein the first transmit opportunity includes a first repetition of physical uplink shared channel (PUSCH);
      indicate a later transmit opportunity via a demodulation reference signal (DMRS), wherein the DMRS for the later transmit opportunity differs from a DMRS for the first transmit opportunity; and
      transmit, at the later transmit opportunity, the one or more CSI reports, wherein the later transmit opportunity includes a later repetition of PUSCH.

2. The UE of claim 1,
   wherein the first transmit opportunity occurs at least 5 symbols after PDCCH monitoring.

3. The UE of claim 1,
   wherein the later transmit opportunity occurs at least 12 symbols after PDCCH monitoring.

4. The UE of claim 1,
   wherein the one or more CSI reports are multiplexed onto the later repetition of PUSCH.

5. The UE of claim 4,
   wherein the later repetition of PUSCH is increased to ensure that a coding rate of the PUSCH is not altered.

6. The UE of claim 4,
   wherein an additional repetition of PUSCH is transmitted to ensure that reliability of the PUSCH transmission is not negatively impacted by the multiplexing of the one or more CSI reports.

7. The UE of claim 1,
   wherein the one or more processors are further configured to:
      transmit, at a subsequent later transmit opportunity, the one or more CSI reports, wherein the subsequent later transmit opportunity includes a subsequent later repetition of PUSCH.

8. The UE of claim 7,
   wherein the later repetition of PUSCH and the subsequent later repetition of PUSCH are increased to ensure that a coding rate of the PUSCH is not altered.

9. The UE of claim 1,
   wherein the later transmit opportunity is identified as a repetition that starts at least a specified number of symbols after a first symbol of the first repetition, wherein the specified number of symbols is dependent upon at least one of UE uplink processing time capabilities or subcarrier spacing.

10. An apparatus, comprising:
    a memory; and
    a processing element in communication with the memory, wherein the processing element is configured to:
       receive, during monitoring of a physical downlink control channel (PDCCH), a request to send one or more channel state information (CSI) reports to a base station;
       generate instructions to transmit, at a first transmit opportunity, first physical uplink shared channel (PUSCH) data;
       indicate a later transmit opportunity via a demodulation reference signal (DMRS), wherein the DMRS for the later transmit opportunity differs from a DMRS for the first transmit opportunity; and
       generate instructions to transmit, at the later transmit opportunity, the one or more CSI reports, wherein the later transmit opportunity includes a later transmission of PUSCH.

11. The apparatus of claim 10,
    wherein the later transmit opportunity is defined by radio resource control (RRC) signaling, wherein the RRC signaling configures a relative slot index/transmission index for CSI multiplexing.

12. The apparatus of claim 11,
wherein the later transmit opportunity is defined by the apparatus.

13. The apparatus of claim 10,
wherein the later transmit opportunity includes a first segment occurring in a first slot and a second segment occurring in a second slot, wherein, when the first segment is larger than the second segment, the one or more CSI reports are multiplexed onto the first segment, and wherein, when the second segment is larger than the first segment, the one or more CSI reports are multiplexed onto the second segment.

14. The apparatus of claim 10,
wherein the later transmit opportunity is identified as a transmit opportunity that starts at least a specified number of symbols after a first symbol of the first transmit opportunity.

15. The apparatus of claim 14,
wherein the specified number of symbols is dependent upon at least one of UE uplink processing time capabilities or subcarrier spacing.

16. A non-transitory computer readable memory medium storing program instructions executable by processing circuitry to cause a user equipment device (UE) to:
receive, during monitoring of a physical downlink control channel (PDCCH), a request to send one or more channel state information (CSI) reports to a base station;
transmit, at a first transmit opportunity, first physical uplink shared channel (PUSCH) data;
indicate a later transmit opportunity via a demodulation reference signal (DMRS), wherein the DMRS for the later transmit opportunity differs from a DMRS for the first transmit opportunity; and
transmit, at the later transmit opportunity, a later transmission of PUSCH, wherein the one or more CSI reports are multiplexed onto the PUSCH.

17. The non-transitory computer readable memory medium of claim 16,
wherein the later transmit opportunity is identified as a transmit opportunity that starts at least a specified number of symbols after a first symbol of the first transmit opportunity, wherein the specified number of symbols is dependent upon at least one of UE uplink processing time capabilities or subcarrier spacing.

18. The non-transitory computer readable memory medium of claim 16,
wherein the first transmit opportunity occurs at least 5 symbols after PDCCH monitoring, and wherein the later transmit opportunity occurs at least 12 symbols after PDCCH monitoring.

19. The non-transitory computer readable memory medium of claim 16,
wherein to ensure that reliability of the PUSCH is not altered due to the multiplexing of the one or more CSI reports, the program instructions are further executable to increase the later transmission of PUSCH or transmit an additional repetition of PUSCH.

20. The non-transitory computer readable memory medium of claim 16,
wherein the program instructions are further executable to:
transmit, at a subsequent later transmit opportunity, a subsequent later transmission of PUSCH, wherein the one or more CSI reports are multiplexed onto the PUSCH, and wherein the later transmission of PUSCH and the subsequent later transmission of PUSCH are increased to ensure that a coding rate of the PUSCH is not altered.

* * * * *